(12) United States Patent
Sesma

(10) Patent No.: US 7,478,408 B2
(45) Date of Patent: *Jan. 13, 2009

(54) SYSTEM AND METHOD FOR ACCESSING OBJECTS IN A PLATFORM DEPENDENT ENVIRONMENT FROM A PLATFORM INDEPENDENT ENVIRONMENT

(75) Inventor: Charles Sesma, Murietta, CA (US)

(73) Assignee: Sesma Systems, Inc., San Diego, CA (US)

( * ) Notice: Subject to any disclaimer, the term of this patent is extended or adjusted under 35 U.S.C. 154(b) by 495 days.

This patent is subject to a terminal disclaimer.

(21) Appl. No.: 10/408,213

(22) Filed: Apr. 4, 2003

(65) Prior Publication Data

US 2004/0103114 A1 May 27, 2004

(51) Int. Cl.
*G06F 13/00* (2006.01)
(52) U.S. Cl. ...................................... 719/328
(58) Field of Classification Search ................ 719/328, 719/331, 332, 318; 717/108
See application file for complete search history.

(56) References Cited

U.S. PATENT DOCUMENTS

| | | | |
|---|---|---|---|
| 5,920,720 A | 7/1999 | Toutonghi et al. | |
| 5,987,611 A | 11/1999 | Freund | |
| 6,003,050 A | 12/1999 | Silver et al. | |
| 6,016,392 A | 1/2000 | Jordan | |
| 6,066,181 A * | 5/2000 | DeMaster | 717/148 |
| 6,167,565 A | 12/2000 | Kanamori | |
| 6,229,537 B1 | 5/2001 | Sobeski et al. | |
| 6,247,020 B1 | 6/2001 | Minard | |
| 6,304,893 B1 * | 10/2001 | Gish | 709/203 |
| 6,327,702 B1 | 12/2001 | Sauntry et al. | |
| 6,349,344 B1 | 2/2002 | Sauntry et al. | |
| 6,415,334 B1 | 7/2002 | Kanamori | |
| 6,418,448 B1 | 7/2002 | Sarkar | |
| 6,438,744 B2 * | 8/2002 | Toutonghi et al. | 717/137 |
| 6,442,620 B1 | 8/2002 | Thatte et al. | |
| 6,457,066 B1 | 9/2002 | Mein et al. | |
| 6,484,311 B2 | 11/2002 | Sobeski et al. | |
| 6,484,312 B1 | 11/2002 | Morrison | |
| 6,504,554 B1 | 1/2003 | Stone et al. | |
| 6,522,343 B2 | 2/2003 | Sobeski et al. | |

(Continued)

FOREIGN PATENT DOCUMENTS

WO     WO 99/31576     6/1999

OTHER PUBLICATIONS

Lingson, H., Exchanging data between Java and C/C++ Windows Programs, C/C++ Users J. (USA), vol. 19 No. 1 pp. 34, 36, 38-40, Jan. 2001.

(Continued)

*Primary Examiner*—Meng-Ai An
*Assistant Examiner*—Phuong N Hoang
(74) *Attorney, Agent, or Firm*—Knobbe, Martens, Olson & Bear, LLP

(57) ABSTRACT

Disclosed are systems and methods for accessing objects executing in a platform dependent environment from objects executing in a platform independent environment. The systems and methods include a platform independent environment and a platform dependent environment that is accessible to the platform independent environment. The systems and methods additionally include an object executing in the platform independent environment that provides access via a native library interface to an object executing in the platform dependent environment.

61 Claims, 17 Drawing Sheets

U.S. PATENT DOCUMENTS

| | | |
|---|---|---|
| 6,609,158 B1 | 8/2003 | Nevarez et al. |
| 6,675,230 B1 | 1/2004 | Lewallen |
| 6,854,123 B1 | 2/2005 | Lewallen |
| 6,862,735 B1 * | 3/2005 | Slaughter et al. ............ 719/315 |
| 6,941,520 B1 | 9/2005 | Lewallen |
| 6,957,439 B1 | 10/2005 | Lewallen |
| 6,986,143 B2 | 1/2006 | Cole et al. |
| 2002/0029378 A1 | 3/2002 | Larsson |
| 2002/0054124 A1 | 5/2002 | Sobeski et al. |
| 2002/0055965 A1 | 5/2002 | Kanamori |
| 2002/0059358 A1 | 5/2002 | Kanamori |
| 2002/0066084 A1 | 5/2002 | Sobeski et al. |
| 2002/0099868 A1 | 7/2002 | Cook et al. |
| 2002/0147860 A1 | 10/2002 | Tapperson |
| 2002/0191018 A1 | 12/2002 | Broussard |
| 2003/0200319 A1 | 10/2003 | Bodine et al. |
| 2003/0232618 A1 | 12/2003 | Le et al. |
| 2004/0003054 A1 | 1/2004 | Becker et al. |
| 2004/0015891 A1 | 1/2004 | Arellano-Payne et al. |
| 2004/0054894 A1 * | 3/2004 | Lambert ..................... 713/165 |

OTHER PUBLICATIONS

Microsoft Tailors Java Strategy as Sun Sues, Comput. Econ. Rep., Int. Ed (USA) vol. 21 No. 11 pp. 1-3, Nov. 1999.

Cavanaugh, B.B., The Ovid Java Client Interface: A Comparison with the Ovid Web Gateway and Windows Client Interfaces, Med. Ref. Serv. Q. (USA) vol. 17 No. 4 pp. 1-15 (1998).

Meng, X., Empirical Study of Java Interprocess Communication in Windows NT Environment, Symposiu on Performance Evaluation of Computer and Telecommunication Systems, SPECTS 98, Obaidat, M.S.; Khalid, H. (Ed) (USA) pp. 238-241 (Winter 1998).

Guinther, T., Java for Windows, EXE vol. 12 No. 5 pp.63-64 (Oct. 1997).

Wilson, A., The Java native method interface and Windows, Dr. Dobb's J. (USA) vol. 22 No. 8, pp. 46, 48-50, 94 (Aug. 1997).

Delessio, C., Converting Windows metafiles to Java, Dr. Dobb's J. (USA) Vo. 22 No. 5 pp. 34, 36-37, 74-75 (May 1997).

Verbowski, Chad, "Using COM objects from Java," Jan. 1999, Microsoft Corporation, pp. 1-32.

Verbowski, Chad, "Integrating Java and COM," Jan. 1999, Microsoft Corporation, pp. 1-32.

Eddon et al., "Understanding the Java/COM Integration Model," Apr. 1997, Microsoft Corporation, pp. 1-13.

Raptis et al., "Java as Distributed Object Blue," Aug. 2000, pp. 1-5.

Halloway, Stuart, "Jawin, An Open Source Interoperability Solution," Nov. 14, 2001, pp. 1-11.

Office Action dated May 3, 2007 for U.S. Appl. No. 10/408,169, 12 pages.

* cited by examiner

SYSTEM AND METHOD FOR ACCESSING OBJECTS IN A PLATFORM DEPENDENT ENVIRONMENT FROM A PLATFORM INDEPENDENT ENVIRONMENT

RELATED APPLICATIONS

This application is related to U.S. application Ser. No. 10/408,169 now are pending, filed on even date herewith and titled "SYSTEM AND METHOD FOR ACCESSING ACTIVEX OBJECTS IN A PLATFORM DEPENDENT ENVIRONMENT FROM A PLATFORM INDEPENDENT ENVIRONMENT," which is hereby incorporated by reference in its entirety.

BACKGROUND OF THE INVENTION

1. Field of the Invention

The present invention generally relates to computer systems. More particularly, the present invention relates to accessing objects executing in a platform dependent environment by objects executing in a platform independent environment.

2. Description of the Related Technology

The use of the Internet has become widespread in recent years for such diverse uses as, for example, accessing many types of information and data, conducting electronic commerce transactions, downloading software applications and multimedia files from servers to client computers or between client computers, conducting online auctions, publishing various news and entertainment media, and conducting online gambling, to name just a few. One common way to display website information and data over the Internet is via web browser programs. A web browser is essentially a software application used to locate and display web pages. Typical web browsers can display text, graphical images and multimedia information, such as audio and video data. Microsoft Internet Explorer and Netscape Navigator are several widely used web browsers.

Java refers to a general purpose programming language having a number of features that make it well suited for use in World Wide Web applications. Java is an object oriented programming language similar to the widely used C++ programming language, but Java is simplified to eliminate C++ language features that cause common programming errors. Internet Explorer and Netscape Navigator are several examples of Java-compatible web browsers.

ActiveX refers to a set of technologies developed by Microsoft, and ActiveX controls are a specific way of implementing ActiveX technologies. ActiveX is not a programming language, but can be thought of as a set of rules for how various applications can share data. Programmers can develop ActiveX controls in a variety of programming languages, for example, C, C++, Visual Basic and Java. ActiveX controls are presently limited to running only on Microsoft Windows operating system environments. Additional information on programming ActiveX controls can be found in David Chappell, "Understanding ActiveX and OLE," 1996, Microsoft Press, ISBN 1-572-31216-5, which is hereby incorporated by reference in its entirety.

ActiveX is based on Microsoft's Component Object Model (COM). COM is a software architecture to build component-based applications. COM objects are discrete components, often referred to as objects, each with a unique identity, which expose interfaces that allow applications and other components to access their features. COM objects are language independent, have built-in interprocess communication capability, and easily fit into an object-oriented program methodology. Additional information on COM can be found in the book titled "Essential COM" by Don Box (Menlo Park, Calif.; Addison-Wesley Publishing Company, 1998, ISBN 0-201-63446-5), which is hereby incorporated by reference in its entirety.

Many web developers have utilized the COM/ActiveX (Microsoft) development model. Unfortunately, this development model has many drawbacks over more modern, robust web programming environments, one example being the Java programming environment. The Microsoft development model is lacking in the security, quality, and stability attributes of high-end deployment methods, for example, Java Network Launcher Protocol (JNLP) and Java Web Start. The JNLP framework of services include a number of desirable features, including, for example, transparent updating and managed versioning of applications, client-side resource caching to minimize client loading for relaunch, handling of the JNLP container entirely in the XML language, flexibility of standardized protocols, and extensibility of the Java platform.

Unfortunately, the Microsoft development model is not compatible with the Java programming environment. In other words, applications developed using the Microsoft development model cannot be readily accessed, modified or deployed using the Java programming environment. Thus, website and web application developers are essentially bound to the Microsoft deployment model.

Therefore, what is needed are systems and methods to develop and deploy existing Microsoft COM/ActiveX applications and Microsoft reliant distributed web applications within the robust, secure and stable Java platform without having to undergo expensive and time consuming rewrites or modifications of the existing applications to make them Java-compatible. The systems and methods should allow for not only existing code to be developed and deployed within the Java environment, but also allow for continued development of applications under the Microsoft environment so that programmers are not required to undergo the cost and frustration of having to learn a new web development and deployment environment.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

Figure 1A:
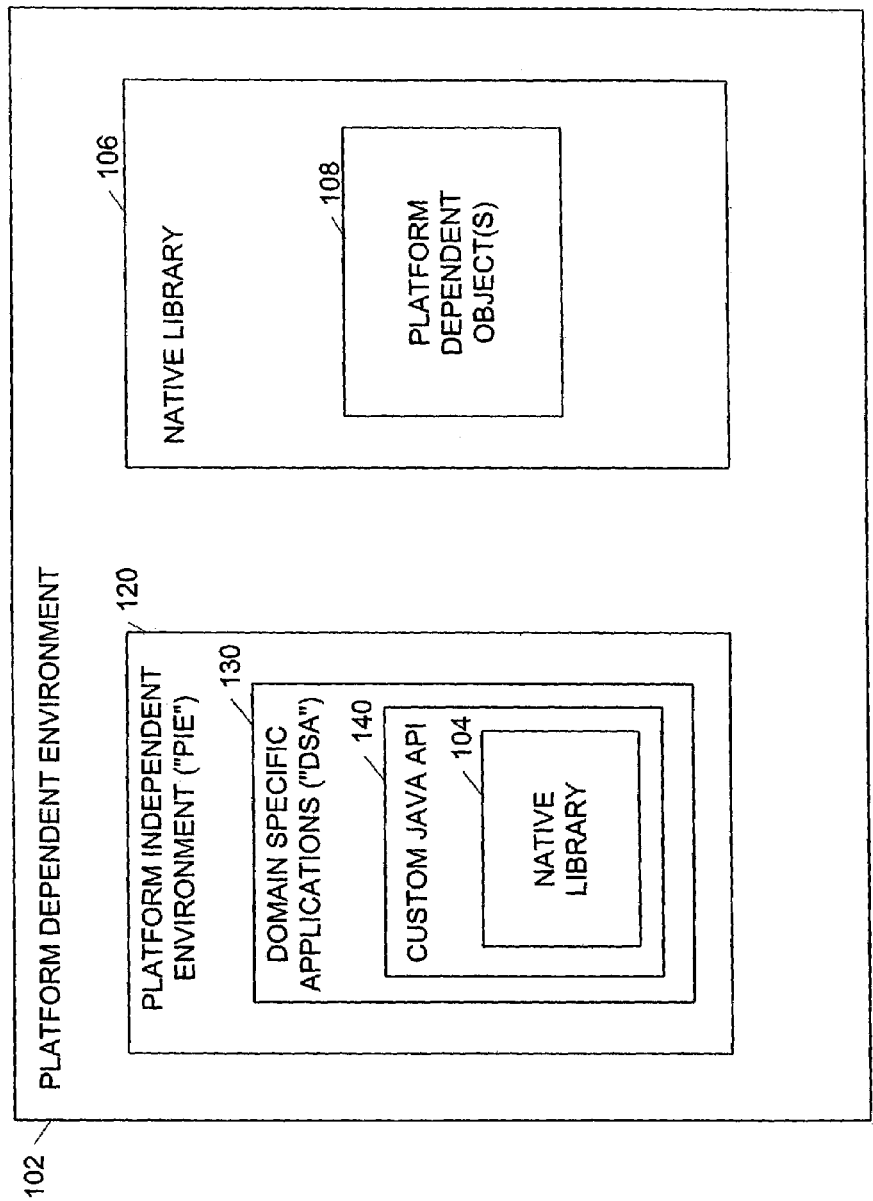
FIG. 1a is a block diagram illustrating various system components of a platform dependent environment.

The following detailed description of certain embodiments presents various descriptions of specific embodiments of the present invention. However, the present invention can be embodied in a multitude of different ways. In this description, reference is made to the drawings wherein like parts are designated with like numerals throughout.

Description of Certain Terms

The following discussion provides a number of descriptions of terms that may be useful in understanding the various embodiments disclosed.

As used herein, the terms "network" and "Internet" refer to a computer communication link or combination of computer communication links spanning any geographical area, such as a local area network, wide area network, regional network, national network, and/or global network. Those terms may refer to hardwire networks, wireless networks, or a combination of these or other networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

As used herein, a VPN is a secure and encrypted communications link between nodes on the Internet, a Wide Area Network (WAN), or an Intranet. These nodes can communicate with each other, however, it is virtually impossible for a hacker to either comprehend the meaning of the signals or send signals that are believed to be authentic. One secure communications technology that is designed to facilitate a VPN is Secure Sockets Layer (or SSL). Other secure communications technologies can be used as well. It is not a requirement that a VPN be a private network such as SITA, the international network for airline reservations.

As used herein, the term "website" refers to one or more interrelated web page files and other files and programs on one or more web servers, the files and programs being accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

In one embodiment, the website of the present invention includes a set of web pages, such as the above-mentioned home page. As used herein, a "web page" comprises that which is presented by a standard web browser in response to an http request specifying the URL by which the web page file is identified. A web page can include, for example, text, images, sound, video, and animation.

As used herein, a "computer" or "computing device" may be any microprocessor or processor controlled device that permits access to the Internet, including terminal devices, such as personal computers, workstations, servers, clients, mini computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touchpad, joystick, pen-input-pad, and the like. The computers may also possess an output device, such as a screen or other visual conveyance means and a speaker or other type of audio conveyance means.

These computers may be uni-processor or multi-processor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such a network interface card, a modem, or other network connection device suitable for connecting to the communication network. Furthermore, the computers execute an appropriate operating system such as Linux, Unix, Microsoft® Windows® 95, Microsoft® Windows® 98, Microsoft® Windows® NT, other versions of the Microsoft® Windows® operating system, Apple® MacOS®, or IBM® OS/2®. As is conventional, the appropriate operating system includes a communications protocol implementation that handles incoming and outgoing message traffic passed over the Internet. In other embodiments, while the operating system may differ depending on the type of computer, the operating system will continue to provide the appropriate communications protocols necessary to establish communication links with the Internet.

The computers may advantageously contain program logic, or other substrate configuration representing data and instructions, which cause the computer to operate in a specific and predefined manner as described herein. In one embodiment, the program logic may advantageously be implemented as one or more object frameworks or modules. These modules may advantageously be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

Computers associated with the website may be generally referred to as "host computers." Computers associated with a customer visiting the website may be referred to as "client computers," "user computers" or "customer computers."

The various components of the system may advantageously communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may advantageously be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

As used herein, the term "platform dependent" refers to applications, operating systems, programming or development environments, or other software systems that run on a specific computer system or operating system. COM objects and ActiveX controls are examples of platform dependent objects, as they execute on platform dependent environments, for example, the Microsoft Windows family of operating systems. Further examples of the many platform dependent environments include the Unix operating system, Linux, OS/2, DOS (Disk Operating System), Apple Macintosh, and many other Windows-based applications.

The term "platform independent" refers to applications, operating systems, programming or development environments, or other software systems that run on a number of different hardware or software environments, and thus are not dependent on a particular computing environment to execute properly. One example of a platform independent environment is the Java environment. Java objects are examples of platform independent objects, as they execute on platform independent environments, for example the Java Runtime Environment. A platform independent environment is intended to be hosted on various heterogeneous hardware platforms and various operating systems, for example, OS/2, Windows, Windows NT, Macintosh OS, or Unix.

As used herein, the term "objects" generally refers to software components having variables and related methods. A software object maintains its state in one or more variables. A variable is an item of data named by an identifier. A software object implements its behavior with methods. A method is a function or subroutine associated with an object. In addition, object-oriented programming methodology groups operations and data into modular units referred to as objects, and allows objects to be combined into structured networks to form a complete program. Objects have both state (i.e., data) and behavior (i.e., operations on data) properties.

Once an object is identified, it can be generalized as a class of objects and defined as for the kind of data the object contains and logic sequences that can manipulate it. Each distinct logic sequence is referred to as a method. A real instance of a class is sometimes called an object, or, in some environments, an instance of a class. The object or class instance is what actually executes in the computer. The object's methods provide computer instructions, and the class object characteristics provide relevant data. Applications or other objects, for example, can communicate with objects via well-defined interfaces, referred to as messages. Platform independent objects and platform dependent objects are types of objects. The distinction is made to show the location of the object as it is executed in memory. That is, platform independent objects execute in platform independent environments, while platform dependent objects execute in platform dependent environments.

As used herein, the term "native library" refers to a collection of functions, objects, and/or code which do not constitute a process, but which can be loaded into a process and invoked. The loading may be done at run time, often referred to as dynamic linked or shared libraries, or at compile time, often referred to as static linked libraries. Examples of native libraries include the Microsoft Windows Dynamical Linked Libraries (DLL's), Microsoft Windows EXE components, or UNIX based systems' shared and static libraries.

DESCRIPTION OF THE FIGURES

For illustrative purposes, the figures and their accompanying descriptions demonstrate certain embodiments in the context of COM objects and ActiveX controls. However, the present invention is not limited to these embodiments, but also includes embodiments in which other related technologies are utilized, e.g., technologies such as document object model (DOM), hypertext markup language (HTML), dynamic HTML (DHMTL), any of a number of scripting languages, and other related technologies. In addition, embodiments utilizing web browsers other than Microsoft Internet Explorer and Netscape Navigator are also feasible, as are other platform independent environments other than the Java environment. Still further, the embodiments described below are applicable to many types of networks and computing systems, as described above in regard to the description of the terms "network" and "computer."

Turning now to the figures, FIG. 1a is a block diagram illustrating various system components of a platform dependent environment 102. Embodiments according to FIG. 1a include a platform independent environment 120 and a native library 106 on a platform dependent environment 102. In some embodiments, the platform independent environment 120 further includes domain specific applications (DSA) 130, a custom Java application programming interface (API) 140, and a native library 104. The domain specific applications 130 may refer to one or more of a number of application programs that execute in or are associated with programming, operating or deploying applications utilizing websites or the Internet. For example, the domain specific applications 130 may include a website application or other Internet-related applications, as well as a component or module that can be executed in the platform independent environment 120, such as a Java Bean, Java application, or Java Applet.

The custom Java API 140 includes a set of modules, protocols or tools for allowing objects instantiated in the platform independent environment 120, for example, a Java runtime environment executing Java objects instantiated from classes included in the custom Java API 140, to access objects in the platform dependent environment 102. The custom Java API 140 is a custom API as it is not a standard Java API, but rather an API designed to enable objects in the platform independent environment 120, for example, Java objects, to access objects in the platform dependent environment 102.

The native libraries described herein may be single-threaded or multi-threaded. In a single-threaded library, only a single library request gets processed at a time, which may also be referred to as serial processing. Thus, if a new request is received while a request is currently being processed, the new request is not processed until the current request is completed. In a multi-threaded library, on the other hand, multiple requests may be processed concurrently, which may also be referred to parallel or concurrent processing. While some embodiments of the native libraries 104, 106 described herein are multi-threaded libraries, other embodiments implement single-threaded libraries for the native libraries 104, 106.

The native library 106 includes one or more platform dependent objects 108 executing in the native library 106 of the platform dependent environment 102. In some embodiments, the native library 104 is loaded by the platform independent environment 120, while in other embodiments, the native library 104 is loaded by the custom Java API 140. The native libraries 104 and 106 in FIG. 1a are shown as separate libraries to illustrate certain embodiments in which platform dependent environments 102 may host multiple native libraries 104, 106 for the purpose of hosting platform dependent objects that are accessible by platform independent objects. In other embodiments, the native libraries 104, 106 are a single native library loaded by the platform independent environment 120.

Figure 1B:
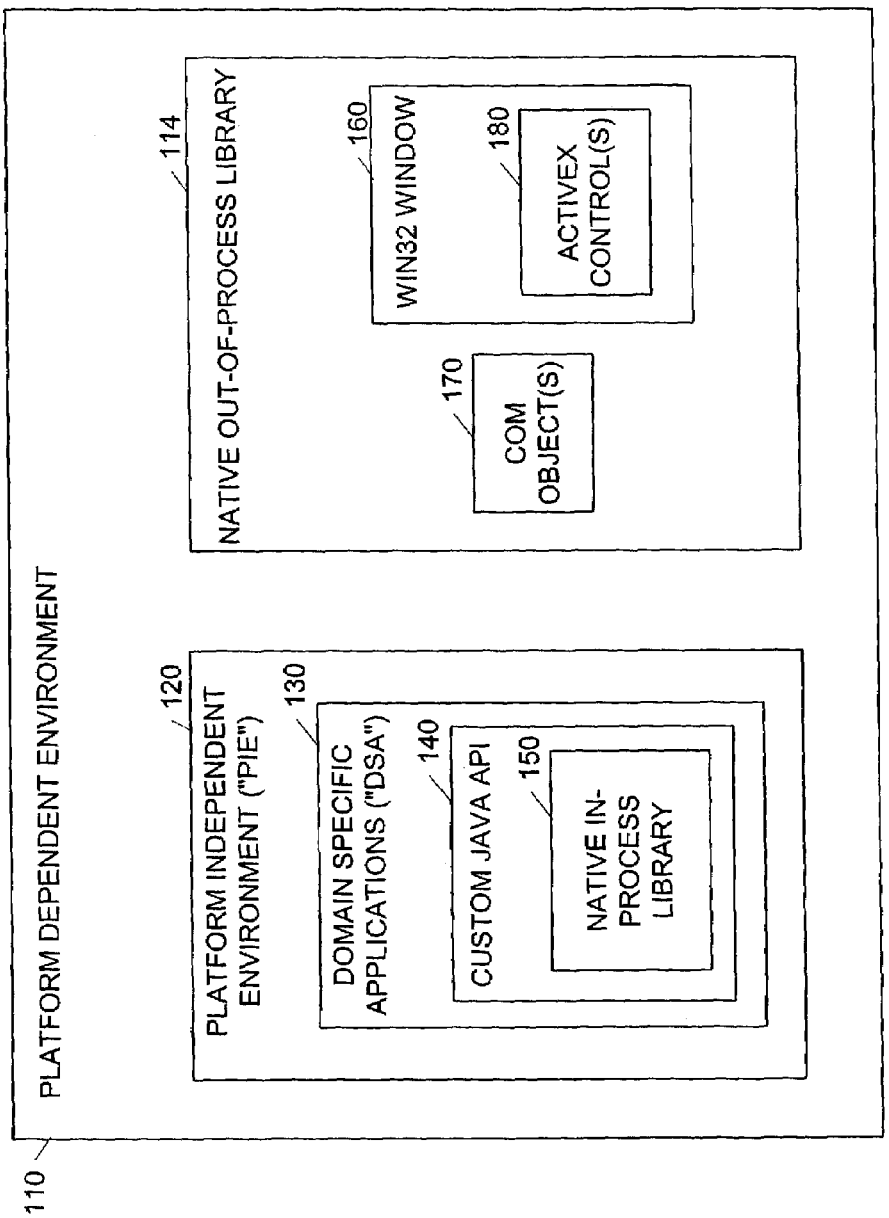
FIG. 1b is a block diagram illustrating various system components of a platform dependent environment that includes a platform independent environment and one or more COM objects.

FIG. 1b is a block diagram illustrating various system components of a platform dependent environment 110 that includes the platform independent environment 120 and one or more COM objects 170. Embodiments according to FIG. 1b include the platform independent environment 120 and a native out-of-process library 114, such as a Windows EXE component, on the platform dependent environment 110, such as one of the family of Microsoft Windows operating systems. In some embodiments, the platform independent environment 120 further includes the domain specific applications (DSA) 130, the custom Java application programming interface (API) 140, and a native in-process library 150, such as a Windows dynamic linked library (DLL). The domain specific applications 130 may refer to one or more of a number of application programs that execute in or are associated with programming, operating or deploying applications utilizing websites or the Internet. For example, the domain specific applications 130 may include a website application or other Internet-related applications, as well as a component or module that can be executed in the platform independent environment 120, such as a Java Bean, Java application, or Java Applet.

The custom Java API 140 includes a set of modules, protocols or tools for allowing objects instantiated in the platform independent environment, for example, a Java runtime environment executing Java objects instantiated from classes included in the custom Java API 140, to access objects in the platform dependent environment 110, for example, COM objects 170 executing on the Windows operating system. The custom Java API 140 is a custom API as it is not a standard Java API, but rather an API designed to enable objects in the platform independent environment, for example, Java objects, to access objects in the platform dependent environment 110, for example, COM objects 170 or ActiveX controls 180.

The native in-process library 150 shown in FIG. 1b includes those portions of native library components that are instantiated within the memory space of the task invoking the native library. In Win32 programming, for example, a process can be defined as a partition of memory containing a running application along with any necessary system resources or external binaries required by the application. Such libraries are typically loaded into the memory partition of the process for the client the libraries are servicing, for example, Win32 in-process COM libraries. A client, such as the platform independent environment 120 or the native in-process library 150, is a software component using a platform dependent object, for example, a Microsoft Windows COM or EXE component. A server may be, but is not limited to, a platform dependent object, such as a binary package (for example, a Microsoft DLL or EXE file) containing any number of COM objects 170, and is referred to herein as the in-process native library 150 or the out-of-process native library 114, such as the native out-of-process or in-process Windows COM library. In-process memory typically can only be accessed by clients running within the same process, and cannot be accessed by any other clients that are executing in a separate process on the computer or on another computer that is connected, for example, via a network.

The system components shown in the embodiments according to FIG. 1b further include the native out-of-process library 114. As distinguished from the native in-process library 150, the client and the native out-of-process library 114 typically execute on the same physical computer but are loaded into distinct memory partitions associated with each process. The client can be any software component executing in the platform dependent environment 110, such as the native in-process library 150. In other words, out-of-process memory refers to memory that is not within the in-process memory associated with a process. The distinction between in-process memory and out-of-process memory shows the various configurations that may occur during the execution of the native libraries 150, 114. While certain platform dependent environments, for example, UNIX or Windows environments, may handle this distinction differently, native libraries can be used as clients or servers that may be either dynamically or statically linked, or may be in-process libraries or out-of-process libraries. While certain embodiments utilize out-of-process memory to store platform dependent objects, for example, COM objects, other embodiments store platform dependent object data in other memory spaces, such as in the task's in-process memory. In other words, certain embodiments as described herein utilize out-of-process memory storage for COM object data to take advantage of certain benefits that such specific implementation decisions afford, but other embodiments, such as storing COM object data in the task's in-process memory, may also be utilized.

Furthermore, the native libraries 150, 114 can reside on separate computers from the client that is typically referred to as a remote server. Communication between the client and the server can be established through distributed protocols, for example, Distributed COM (DCOM) protocols that use Remote Procedure Calls (RPCs) to transfer information between computers. Certain embodiments fully support and provide access to objects and controls executing in remote locations, thus providing what is often referred to as location transparency. Location transparency refers to the clients having limited knowledge regarding on what computer the server is executing. For example, in a Windows environment, DCOM handles the communication between the client and the server transparently, allowing clients to communicate with servers regardless of their locations.

For additional information on distinctions between in-process memory space, out-of-process memory space, and remote servers, see Andrew Troelsen, "Developer's Workshop to COM and ATL 3.0," Wordware Publishing, Inc., May 2000, ISBN 1-55622-704-3, which was referred to and incorporated by reference above.

In addition to in-process or out-of-process libraries, the native libraries described herein may be single-threaded or multi-threaded. In a single-threaded COM library, only a single library request gets processed at a time, which may also be referred to as serial processing. Thus, if a new request is received while a request is currently being processed, the new request is not processed until the current request is completed. In a multi-threaded platform dependent native library, on the other hand, multiple requests may be processed concurrently, which may also be referred to parallel or concurrent processing. While some embodiments of the platform dependent native libraries described herein are multi-threaded libraries, other embodiments implement single-threaded libraries for either the native out-of-process library, the native in-process library, or both.

The native out-of-process COM library 114 may include, but is not limited to, a Microsoft compatible window, such as a Win32 window 160. Win32 refers to the Microsoft Windows API for developing 32-bit applications, such as in the Windows 95 and Windows NT operating systems. The Win32 window 160 may include, or host, one or more ActiveX controls 180. In addition, the native out-of-process library 114 may include, but is not limited to, one or more COM objects, for example, COM objects that are not hosted within a Win32 window 160. In addition to Win32 windows as shown in the embodiment of FIG. 1b, other Microsoft compatible windows are also possible, for example, 64 bit compatible windows, or other Microsoft compatible windows implementing compatibility with any number of data bits.

It should be noted that embodiments of the invention are applicable to a wide variety of platform independent environments, as well as enable access to a variety of objects in platform dependent environments. When the description herein refers to specific embodiments utilizing Java environment and Java objects, it should be understood that such references are for illustrative purposes and apply similarly to embodiments utilizing other platform independent environment objects and environments. Likewise, when reference is made to specific embodiments utilizing COM libraries and objects or ActiveX controls, it should be understood that such references are for illustrative purposes and apply similarly to embodiments utilizing other platform dependent libraries, objects and environments. In addition, the COM objects or ActiveX controls may execute within Microsoft developed applications, such as Internet Explorer, or any of a large number of third party applications, developed by other vendors in addition to Microsoft, that run either standalone or within a Microsoft application, for example, Shockwave or Flash Player from Macromedia. The embodiments disclosed herein fully support and provide access to objects and controls executing in either Microsoft developed applications or third party applications.

The embodiments described herein are also capable of providing access to objects executing within the .NET framework. Microsoft .NET is a software environment that connects information, people, systems and devices, and spans clients, servers and developer tools. The .NET framework is the programming model of the .NET environment for building, deploying and running web-based applications, smart client applications and XML web services that expose their functionality over a network using standard protocols. In the .NET environment, native objects are referred to as unmanaged objects, and .NET objects are referred to as managed objects. The .NET environment is essentially a restructuring of the Microsoft environment model based on the previous technology, but provides a substantially new interface.

The .NET environment essentially combines the philosophy of COM and the philosophy of Java into a new architecture. For example, like Java, .NET binaries can contain platform-neutral instructions (referred to as IL code) that can be compiled to .NET-formats using a just-in-time compiler. A just-in-time compiler is a code generator that converts Java bytecode into machine language instructions. Like COM, .NET binaries written in different programming languages can communicate with each other. The .NET environment essentially allows developers to build a code base using the developer's choice of programming language or combination of programming languages, and the resulting code can be run on any operating system targeting .NET.

Objects that adhere to the .NET architecture are generally not directly accessible by objects that adhere to the COM architecture. However, .NET objects are accessible through a process of allowing communication between .NET objects and COM objects through proxy objects created by the .NET runtime. These proxy objects are referred to a Runtime Callable Wrapper (RCW) and a COM Callable Wrapper (CCW). The CCWs allow seamless communication from COM clients to .NET types. In this way, embodiments of the present systems and methods described herein automatically have full access to .NET objects (.NET types) executing within the .NET runtime environment.

The RCWs are .NET objects that are in charge of directing calls between a managed unit of code and a given COM type. The RCW intercepts the calls of a managed client to a given COM type, and translates incoming arguments into terms of Interface Definition Language (IDL) data types, and invokes the coclass method. IDL is a language of COM that provides a way to specify the functionality of a COM server such that COM language mappings can access them. Coclass refers to a COM class that is the definition of a user-defined type (UDT) implementing at least IUknown. A COM object is an instance of coclass. If the coclass returns any information to the caller, for example, via IDL parameters, the RCW is responsible for translating the IDL type(s) into the appropriate .NET type(s).

In addition, the RCW may also attempt to look to the .NET client as though it is a native .NET type with which the .NET client is communicating. To accomplish this, the RCW hides a number of low-level COM interfaces from view, for example, IClassFactory, IUnknown, IDispatch, and the like. Therefore, rather than the .NET client having to make manual calls to create instances of coclass objects, the .NET client is able to use the activation keyword of its code base, for example, "new," "New," and the like. The RCW is also responsible for mapping COM error objects, for example, IErrorInfo or ICreateErrorInfo, into managed exceptions. Still further, the RCW is responsible for mapping COM event handling primitives into terms of managed delegates.

Thus, when a .NET client wants to communicate with a legacy COM type, the RCW is used to transform .NET requests into COM compatible requests. Similarly, when a COM client wishes to communicate with a new .NET type, a CCW is created. The CCW is responsible for making the COM client, for example, a coclass in a *.dll file as well as a traditional *.exe file, believe it is communicating with a normal COM type. In addition to acting as a proxy for some number of COM clients, the CCW transforms COM data types into .NET equivalents, provides canned implementation of standard COM interfaces, and simulates COM reference counting and type coercion for the .NET type. Thus, CCWs exist to seamlessly direct COM requests to an existing .NET type.

For additional information on accessibility of .NET objects by COM objects and vice versa, see Andrew Troelsen, "COM and .NET Interoperability," April 2002, APress L. P., ISBN 1-59059-011-2, and Andrew Troelsen, "Developer's Workshop to COM and ATL 3.0," Wordware Publishing, Inc., May 2000, ISBN 1-55622-704-3, which are hereby incorporated by reference in their entirety.

Figure 2:
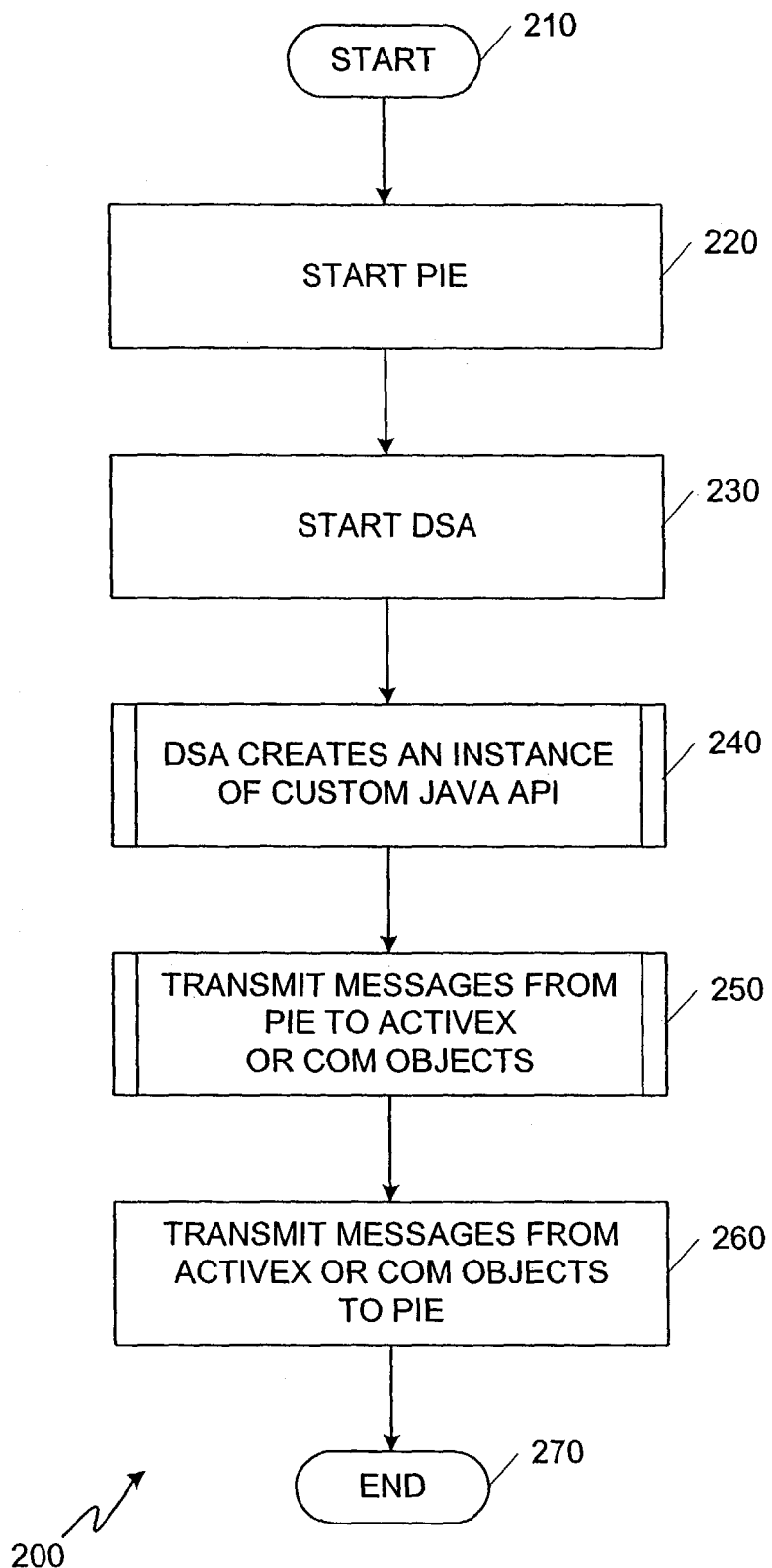
FIG. 2 is a flowchart illustrating embodiments of a top-level process of transmitting messages between objects in the platform dependent environment and the COM/ActiveX objects.

FIG. 2 is a flowchart illustrating embodiments of a top-level process 200 of transmitting messages between objects in the platform independent environment 120 and the COM/ActiveX objects. Messages may communicate many types of data between objects and may utilize many ways of transmitting messages, for example, via property invocation, message invocation, or event notification, which can be invoked in a native interface. The process 200 starts at a block 210. The process 200 includes a block 220 to start the platform independent environment 120, for example, a Java runtime environment (JRE). In other embodiments, the platform independent environment 120 may be a non-Java environment, in which case the domain specific applications 130 instantiate the JRE to then instantiate the custom Java API 140. The process 200 continues at a block 230 to start one or more domain specific applications 130. The process 200 continues at a block 240, at which the domain specific application 130 creates an instance of the custom Java API 140. Embodiments of the process for performing the block 240 are shown and described in further detail with regard to FIG. 3.

The process 200 shown in FIG. 2 continues at a block 250, at which objects in the platform independent environment 120 transmit one or more messages to ActiveX or COM objects. Embodiments of the process for performing the block 250 are shown and described in further detail with regard to FIG. 4. The process 200 shown in FIG. 2 continues at a block 260, at which the ActiveX or COM objects transmit one or more messages to objects in the platform independent environment 120. The process 200 shown in FIG. 2 ends at a block 270.

Figure 3:
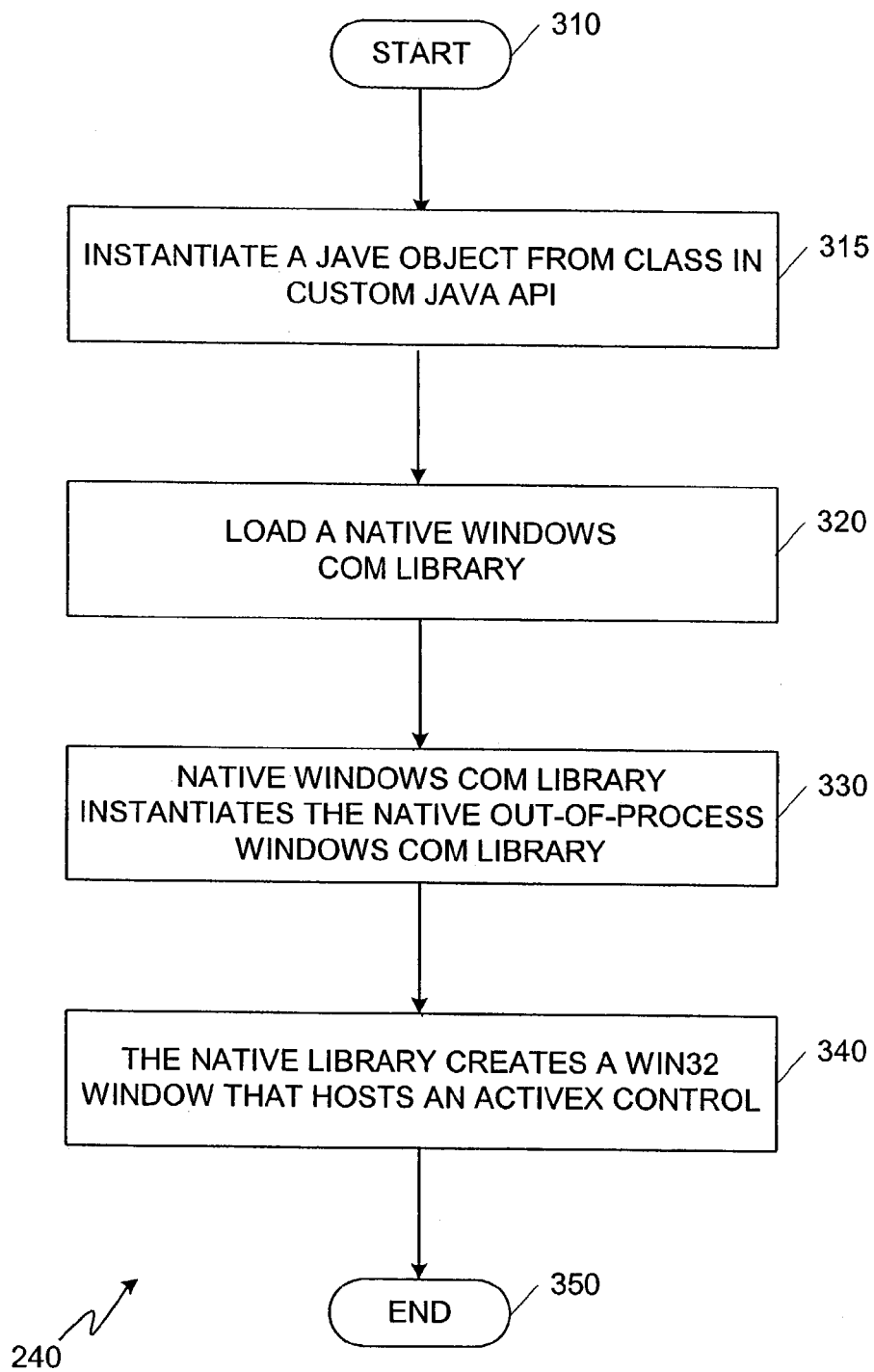
FIG. 3 is a flowchart illustrating in further detail some embodiments of the top-level process of creating an instance of a custom Java API as shown in FIG. 2.

FIG. 3 is a flowchart illustrating in further detail some embodiments of the top-level process 240 of creating an instance of a custom Java API as shown in FIG. 2. The process 240 begins at a block 310, for example, when a domain specific application 130 executes on a platform independent environment 120. The process 240 continues at a block 315 for retrieving or instantiating Java objects from classes in the custom Java API 140 that are hosted or that execute in the platform independent environment 120, or in one or more of the domain specific applications 130, for example, the Java runtime environment. The process 240 continues at a block 320 for loading a native platform dependent library, for example, a COM library. The process 240 continues at a block 330, at which the platform dependent native library instantiates an out-of-process platform dependent native library. In other embodiments, the process 240 does not include the block 330, as the native platform dependent COM library may be instantiated without utilizing out-of-process memory space. For example, the platform dependent native library may be instantiated in the in-process memory space, which is discussed above in regard to FIG. 1.

Certain embodiments of the process 240 to create an instance of a custom Java API further include a block 340. At the block 340, the native library creates a platform dependent window, e.g., a Win32 window, which hosts an ActiveX control. Other embodiments of the block 340 include the creation of COM objects that are hosted in the out-of-process native library 114, and thus do not involve the creation of Win32 windows. Depending on whether a COM object or ActiveX control is executing, the out-of-process native library 114 can host either ActiveX controls or COM objects for access by platform independent objects, for example, Java objects, executing in a platform independent environment 120. In still other embodiments, as described above, the process 240 does not include the block 330, as the platform dependent native library 114 may be instantiated without utilizing out-of-process memory space. The process 240 ends at a block 350.

Figure 4:
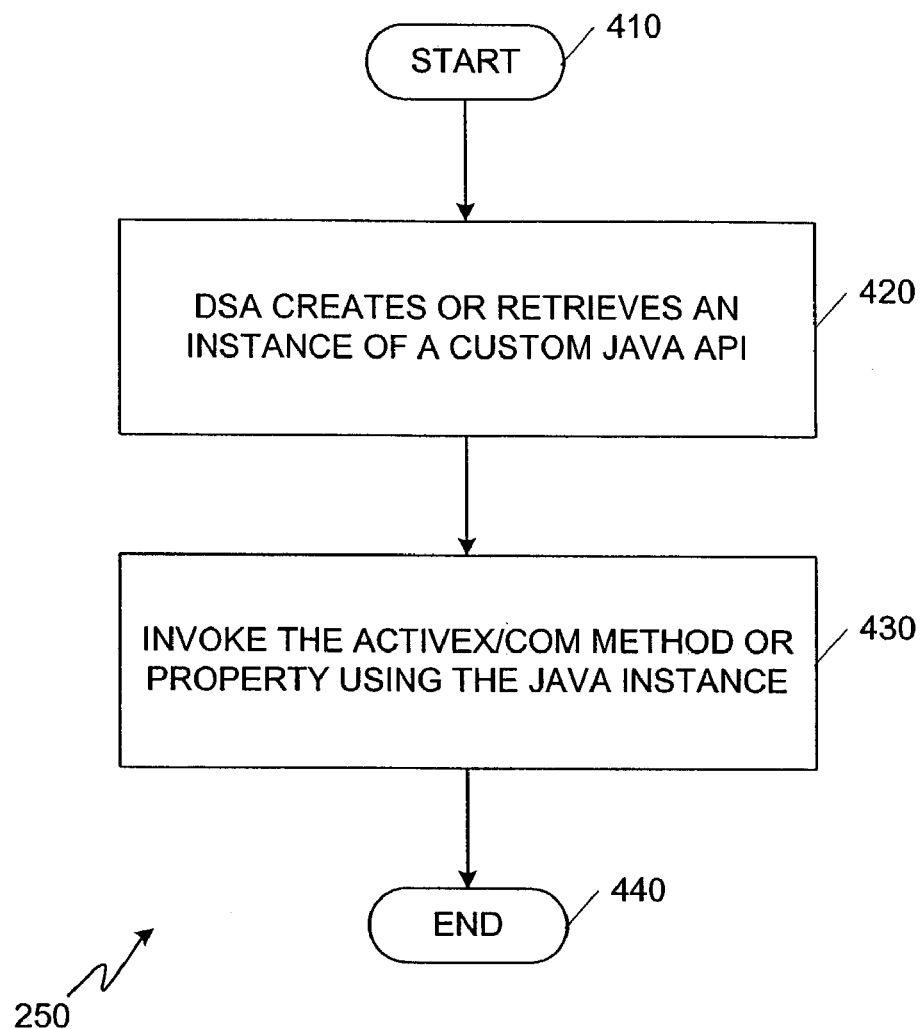
FIG. 4 is a flowchart illustrating in further detail certain embodiments of the top-level process of transmitting one or more messages to ActiveX or COM objects as shown in FIG. 2.

FIG. 4 is a flowchart illustrating in further detail certain embodiments of the top-level process 250 of transmitting one or more messages to the ActiveX or COM objects as shown in FIG. 2. The process 250 begins at a block 410. The process 250 continues at a block 420, at which the domain specific application 130 creates or retrieves an instance of a Java class that represents a native COM or ActiveX object, or that represents a native method or property of a COM or ActiveX API. The Java class is a part of the custom Java API 140 as shown in FIG. 1. The process 250 continues at a block 430 for invoking the ActiveX/COM method or property using the Java instance created or retrieved in block 420. The process 250 ends at a block 440.

Figure 5:
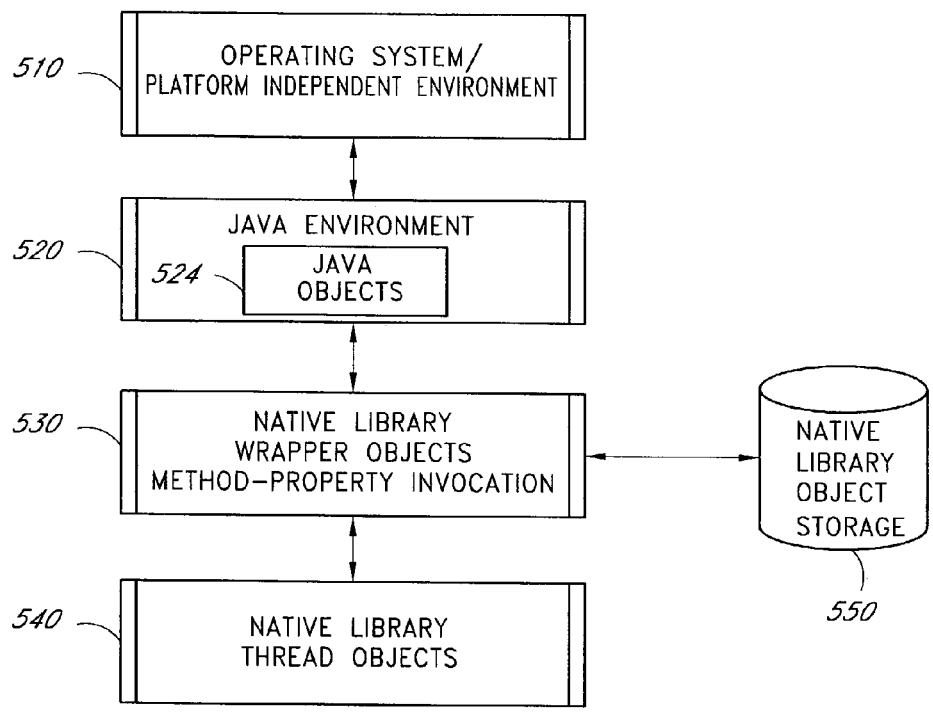
FIG. 5 is a block diagram illustrating one example of a top-level system architecture in accordance with embodiments of the invention.

FIG. 5 is a block diagram illustrating one example of a top-level system architecture 500 in accordance with embodiments of the invention. The system architecture 500 shown in FIG. 5 includes a block 510 that represents components of both the platform dependent environment 102, 110 and the platform independent environment 120 as shown and described above in regard to FIG. 1. Embodiments of the system architecture 500 additionally include the executing Java environment 520. The Java environment 520 includes instantiated Java objects 524, which may be instances of Java classes of the custom Java API 140. The system architecture 500 further includes a block 530 having native library wrapper objects for method/property invocation and event notification. In certain embodiments, the wrapper objects can invoke methods and properties of the instance of the Java object in the Java environment 520.

Wrapper objects are a kind of middleman for objects in the platform independent environment to pass data, including events, to objects in the platform dependent environment 102, 110, and vice versa. In other words, through the wrapper objects, objects in the different environments are able to pass data without being bound to the particular interface of objects of other libraries. In this way, wrapper objects provide for and fully support the late binding aspects of platform dependent native libraries as opposed to early binding. With early binding, certain interface methods and properties are typed into the program before the compilation of the program, thus binding the resulting executable program to the specific names specified in the library interface. Thus, any change to the interface requires modifying the program code, recompiling and relinking the program, and redistributing the executable program. However, with late binding, the specific methods and properties are received when the program runs, thus the program is not bound at compile time as is the case with early binding.

The system architecture 500 may additionally include an object storage area 550 for storing the index information for the various objects that are in existence at any particular point in time. The object storage area 550 may be any device capable of storing computer information, such as, for example, any form of computer memory, hard disks (including database storage systems), floppy disks, optical disks, magnetic tape devices, and the like. In the embodiments as shown in FIG. 5, the object storage area 550 is accessed through the native object library wrapper objects 530. The system architecture 500 further includes the native library thread objects 540. In some embodiments, the native library thread objects 540 may exist in a separate location from the native library wrapper objects 530, as is shown in FIG. 5. In other embodiments, the native library thread objects 540 may exist within the memory space of the native library wrapper objects 530 (not shown).

Figure 6:
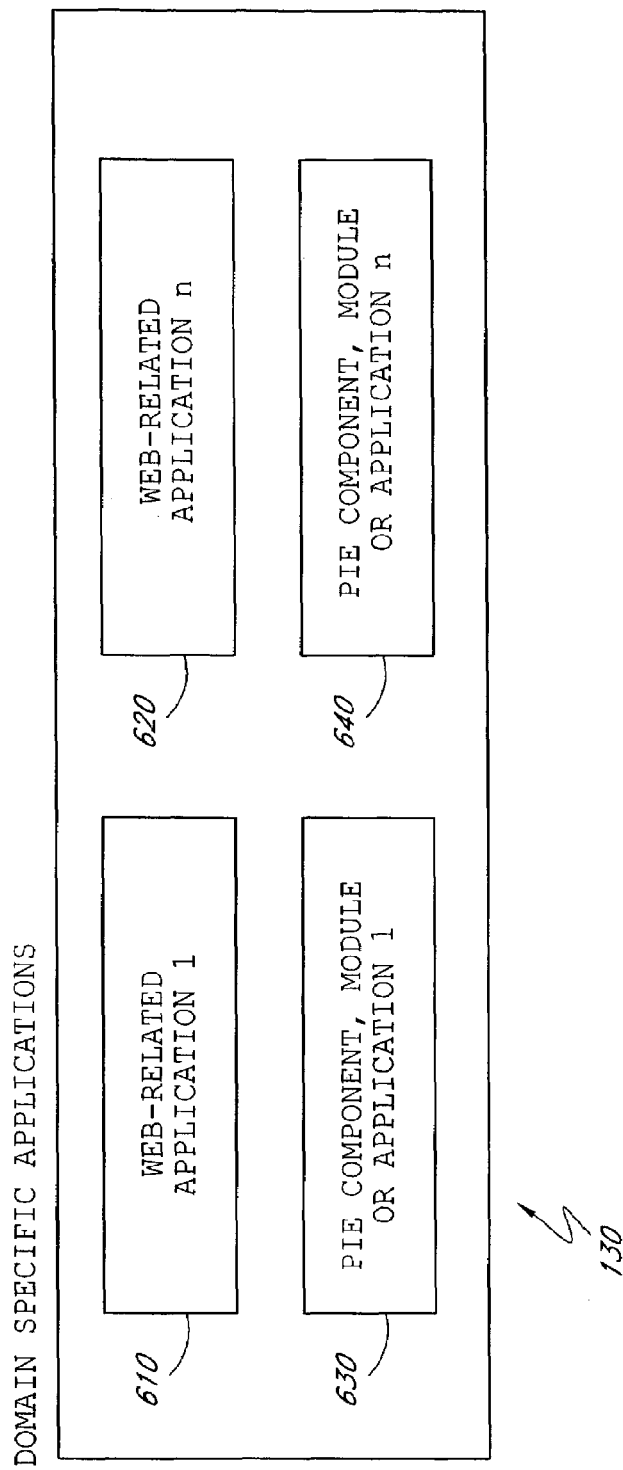
FIG. 6 is a block diagram illustrating the components according to some embodiments of the domain specific applications shown in FIG. 1.

FIG. 6 is a block diagram illustrating the components according to some embodiments of the domain specific applications 130 shown in FIG. 1. As discussed above in regard to FIG. 1, the domain specific applications 130 may include a web-related application 1 610, for example, a browser hosting a web application, or other Internet-related applications. The domain specific applications 130 shown in FIG. 6 additionally include a web-related application n 620. While only a single web-related application may be executing at a given time, FIG. 6 also illustrates that any number of web-related applications may be executing simultaneously. This is indicated by the letter 'n' appended to the end of the application in block 620. The domain specific applications 130 may additionally include a platform independent environment component, module, or application 1 630, for example, a Java Bean, a Java Application or a Java Applet. Although only one platform independent environment component, module, or application 1 620 may be executing at a given time, any number may be executing simultaneously, as illustrated in FIG. 6 by a platform independent environment component, module, or application n 640.

Figure 7:
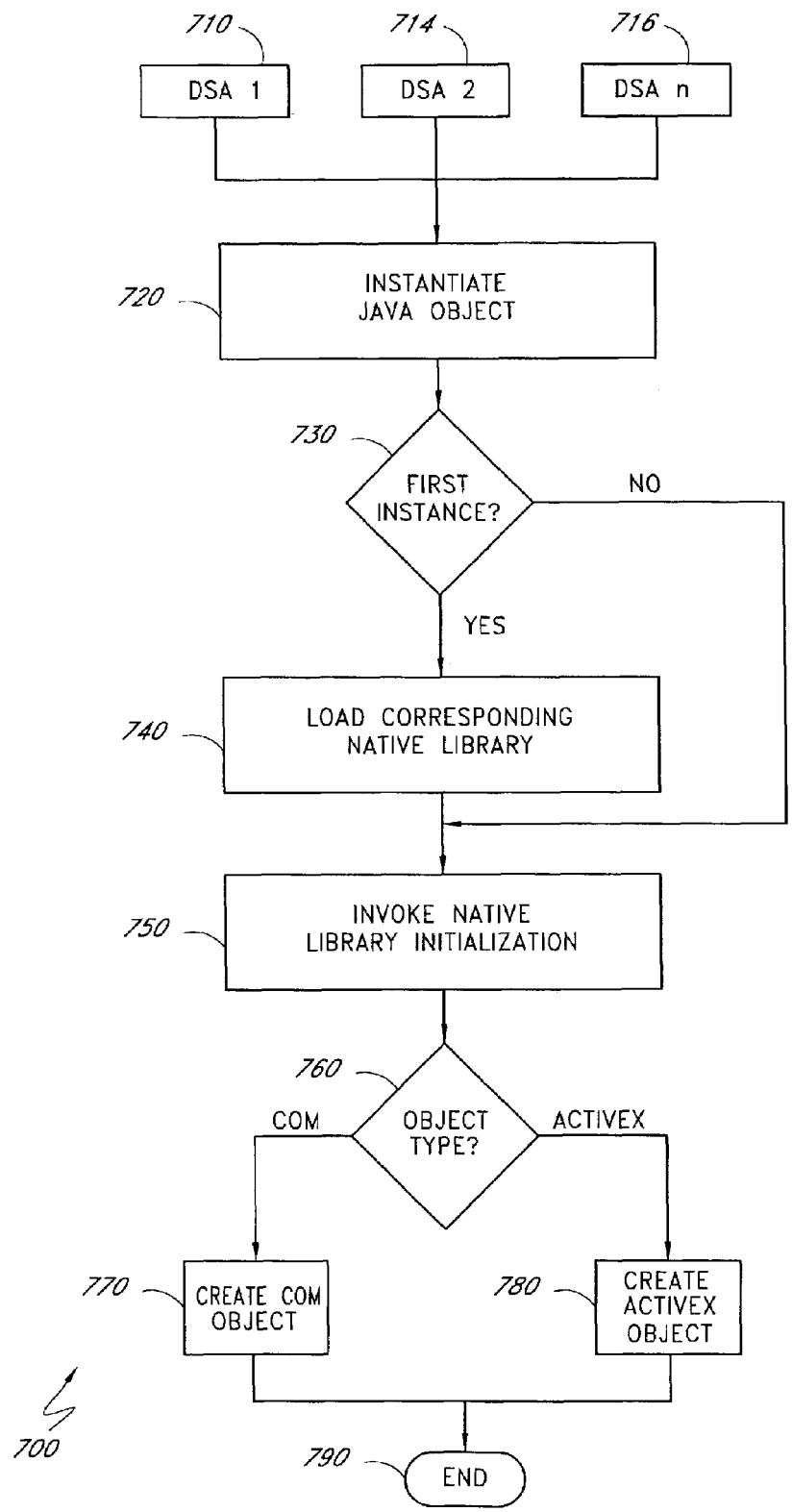
FIG. 7 is a flowchart illustrating a process of instantiating Java objects in certain embodiments of the Java environment component shown in FIG. 5.

FIG. 7 is a flowchart illustrating a process 700 of instantiating Java objects in certain embodiments of the Java environment 520 component shown in FIG. 5. The process begins at blocks 710, 714, or 716, when one or more of the domain specific applications 130, labeled DSA 1 710, DSA 2 714, and DSA n 716 in FIG. 7, utilize the custom Java API 140 to instantiate one or more Java objects that represent specific Java classes from the custom Java API 130. The step of instantiating the Java object is represented by a block 720. In some embodiments, the Java object may be instantiated in the block 720 through the exposed public interface, sometimes referred to as the object factory, of the Java API.

The process 700 continues at a decision block 730 to determine if it is the first instance of the Java object being instantiated. If the process 700 determines at the decision block 730 that the Java object is the first instance executing in the platform independent environment 120, which may be a Java runtime environment, the process 700 continues at a block 740 to load the corresponding native library. At the block 740, the native library loaded is a specific custom native library, as opposed to just any generic native library. In this way, the custom native library instance is loaded upon creation of the first object creation. Upon creation of subsequent objects, since the native library instance is already loaded, this loaded native library instance is then used by the subsequent objects. In certain embodiments, when additional platform independent environments 120, which may be Java runtime environments, are loaded, the steps described thus far in the process 700 are repeated. The steps in the blocks 730 and 740 of determining whether the native library is currently loaded or needs to be loaded is performed transparently to the creator of the object.

The process 700 continues at a block 750 to invoke initialization of the native library loaded at the block 740. If at decision block 730 the process 700 determines that this is not the first instance of instantiating the Java object, the step at block 740 of loading the native library is not performed and the process 700 continues at the block 750. The block 750 to initialize the native library may include passing in initialization data as one or more input parameters. The initialization input parameter data can be used by the initialization process to set its internal identifier property data.

The process 700 continues at a decision block 760, where the process 700 determines the type of object being instantiated. If the process 700 determines that a COM object is being instantiated, the process 700 continues at a block 770 to create the COM object. If the process 700 determines that an ActiveX object is being instantiated, the process 700 continues at a block 780 to create the ActiveX object. In either case, the native wrapper object is created and stored in the object storage area 550, for example, using the hash code of the Java object being used as the storage key. After either the block 770 or the block 780, the process 700 ends at block 790.

The block 720 for instantiating the Java object may include creating a top-level Java object and one or more child Java objects. The top-level Java objects are typically the first objects created and provide an entry point to the COM or ActiveX object API's functionality. The child Java objects typically include, for example, method parameters, method return values, or event data, and are created as a result of using the top-level Java object.

The top-level Java objects typically include one or more properties, for example, an internal identifier, such as a hash code, of the Java object. Additionally, the top-level Java object may include event notification mechanisms, for example, to provide methods to add or remove event listeners, and to provide methods to notify event listeners. As an example, an event listener could be a domain specific application 130 as described above in regard to FIGS. 1 and 6. The top-level Java object may further include public and private methods. An example of a public method is a method that exposes an interface to the domain specific applications 130, which invoke native methods. Private methods typically are those methods that provide native methods to allow access to the native library, or methods that are specific to the functionality of the particular object. The private methods invoke native methods in the native library. However, in some embodiments, the methods that are typically private methods, for example, those methods that allow access to the native library or that are specific to the functionality of the particular object, could be public methods.

The child Java objects generally include one or more properties, for example, a parent identifier, such as an identifier that is equivalent to the internal identifier of the corresponding top-level object, and an internal identifier, such as the hash code of the child Java object. Child Java objects may also be top-level Java objects to other Java objects. Thus, the child Java objects may include the functionality and qualities of the top-level Java objects, and may further include the associations that the top-level Java objects have with their respective child Java objects, as described above. The child Java object may additionally include public and private methods, which in certain embodiments are similar to the public and private methods of the top-level Java objects as described above. The private methods of the child Java object also typically invoke the native method in the native library.

Figure 8:
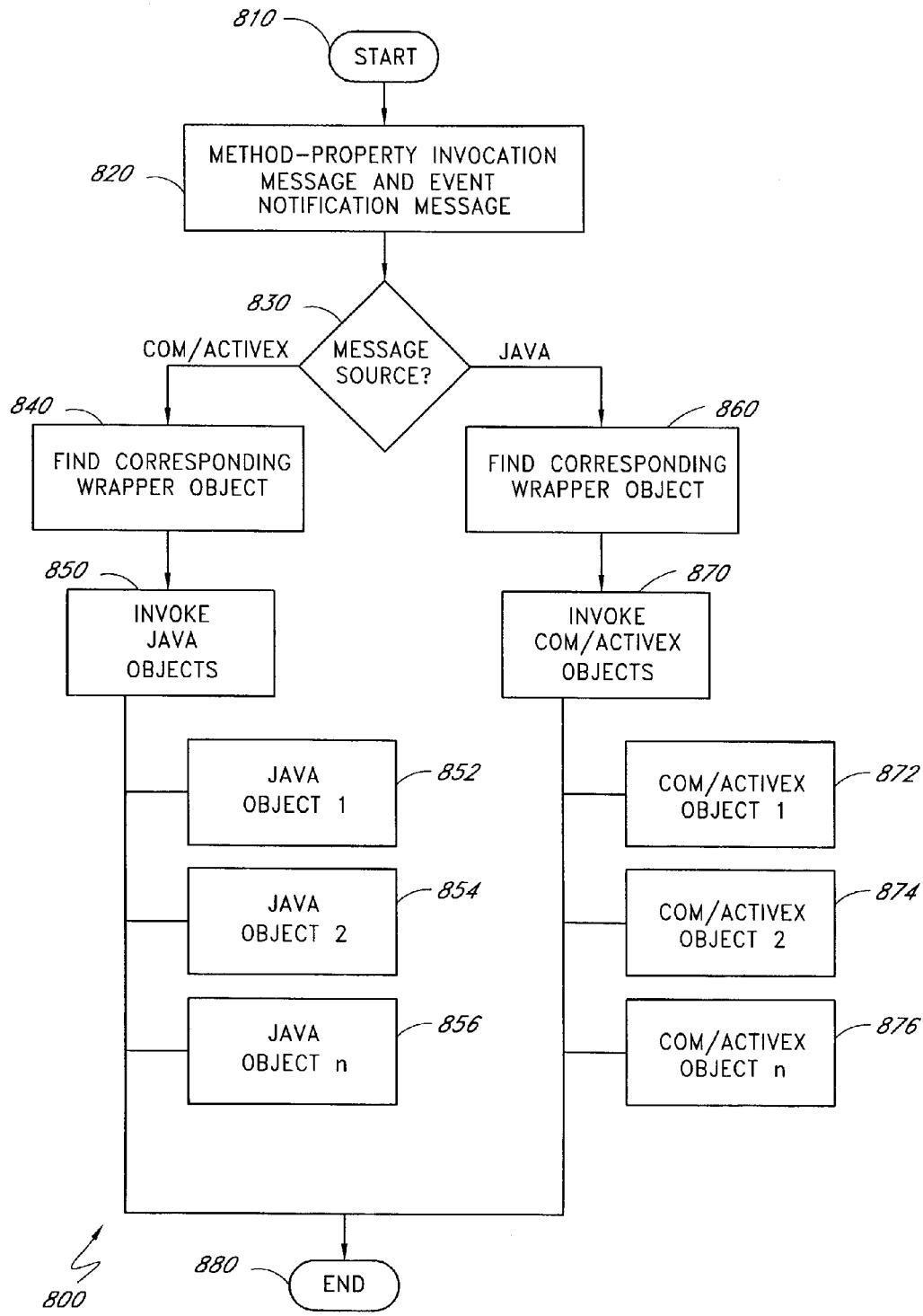
FIG. 8 is a flowchart illustrating a process of invoking native library wrapper objects in some embodiments of the native library wrapper objects component shown in FIG. 5.

FIG. 8 is a flowchart illustrating a process 800 of invoking native library wrapper objects in some embodiments of the native library wrapper objects 530 component shown in FIG. 5. In certain embodiments, the wrapper objects include properties, for example, an internal identifier, Java object information, sink object information, or a pointer to the IUnknown interface. The term "IUnknown" refers to an interface that platform dependent objects support that can be used to pass messages and events to external objects or applications. A client can call an IUnknown method to find out if an object supports a particular interface, and to obtain a reference to it. Thus, if any platform dependent object data that supports an IUnknown interface is encountered, a wrapper object is created so messages can be transmitted to the object or received from the object. More specifically, using the wrapper objects, messages can be transmitted from platform independent objects to platform dependent objects, or from platform dependent objects to platform independent objects.

The IUnknown interface does not allow for late binding, but instead requires early binding. Early binding and late binding interface are discussed above in regard to FIG. 5. A COM library platform dependent object interface that does allow for late binding is the IDispatch interface. The IDispatch interface provides a late binding mechanism to access and retrieve information about an object's methods and properties. Objects in the platform dependent environment 102, 110 expose the IUnknown interface. However, objects in the platform dependent environment 102, 110 do not necessarily expose the IDispatch interface. The IDispatch interface takes a Variant structure as a parameter. Essentially, the Variant structure is a container for a large union that carries many types of data. The data in a Variant structure can represent any of a number of data types, for example, character (data type "char") or integer (data type "int"). The Variant data type supports late binding by not requiring applications to know the underlying data type at compile time (e.g., not until run time).

The wrapper objects may additionally include event handler objects, for example, a sink object or a Java object reference. The sink object may be included to handle event notification messages from objects in the platform dependent environment 102, 110 to objects in the platform independent environment 120. A Java object reference may additionally be included to handle messages from objects in the platform dependent environment 102, 110 to objects in the platform independent environment 120. The wrapper objects may further include an object having a pointer to the IUnknown interface of the COM or ActiveX object. However, only one pointer to the IUnknown interface typically exists for each wrapper object. For example, if the wrapper object is for a COM object, the IUnknown pointer points to the internal COM IUnknown interface. If, however, the wrapper object is for an ActiveX object, the IUnknown pointer points to the internal ActiveX IUnknown interface. Through the IUnknown interface, an object can query the interface for IDispatch, which allows us to do late binding as specified by the COM interface.

The process 800 begins at a start block 810. The process 800 continues at a block 820, at which a method-property invocation and event notification message is received. The process 800 continues at a decision block 830, where the process 800 determines the source of the received message, e.g., who is initiating the request. If the process 800 determines that the source of the message is a COM or ActiveX object, the process 800 continues to a block 840 to find the corresponding wrapper object, for example, in the native library object storage area 550. The process 800 continues to a block 850 to invoke one or more Java objects. To illustrate that one or more Java objects may be invoked, FIG. 8 includes blocks showing invocation of a Java object 1 852, a Java object 2 854, and a Java object n, 856. In other words, the 'n' index in the Java object n 856 indicates that any number of Java objects may exist at any point in time.

Alternatively, if the process 800 determines at the decision block 830 that the source of the received message is a Java object, the process 800 continues to a block 860 to find the corresponding wrapper object, for example, in the native library object storage area 550. The process 800 continues to a block 870 to invoke one or more COM or ActiveX objects. To illustrate that one or more COM or ActiveX objects may be invoked, FIG. 8 includes blocks showing invocation of a COM/ActiveX object 1 872, a COM/ActiveX object 2 874, and a COM/ActiveX object n, 876. In other words, the 'n' index in the COM/ActiveX object n 876 indicates that any number of COM or ActiveX objects may exist at any point in time. In some embodiments, the wrapper objects that represent COM or ActiveX objects have a pointer to the instance, for example, the in-process instance, of the COM or ActiveX object. In these embodiments, the calls to the COM or ActiveX objects may be made directly. After either the invocation of Java objects at the block 850 or COM/ActiveX objects at the block 870, the process 800 ends at a block 880.

Figure 9:
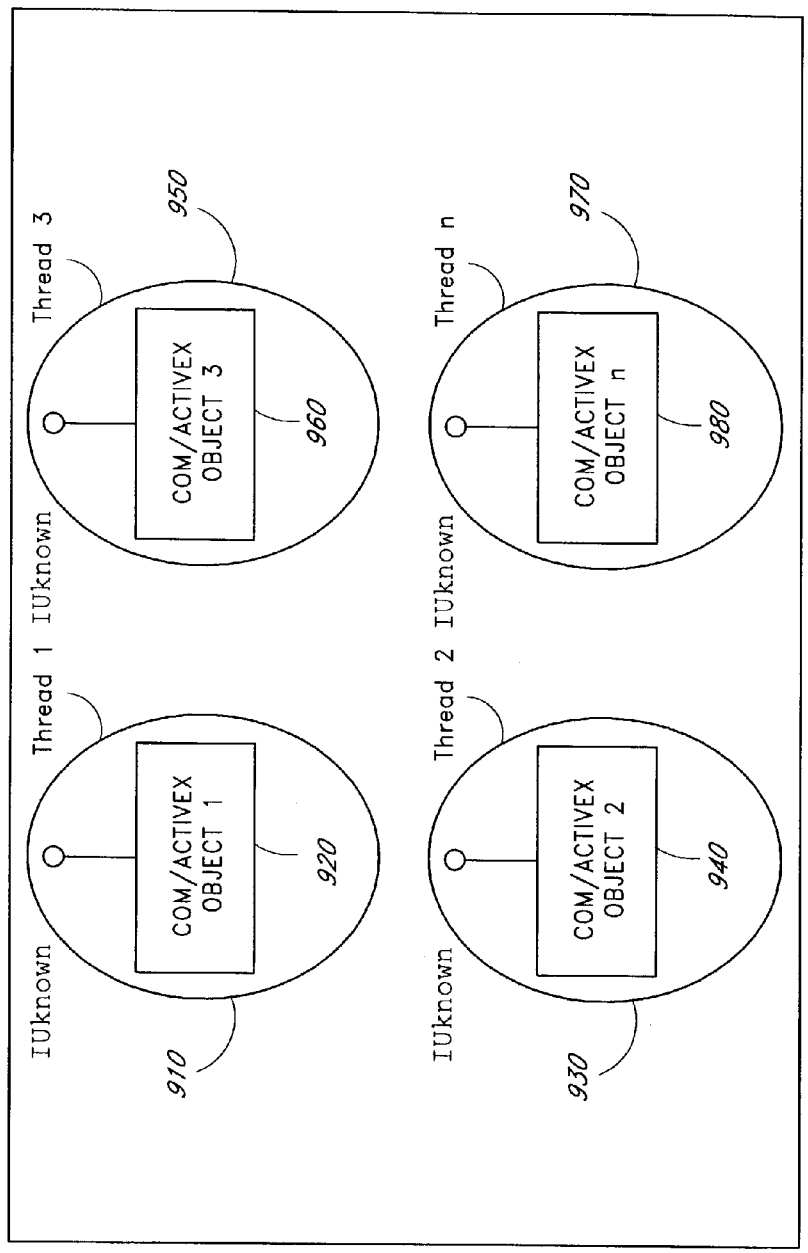
FIG. 9 is a flowchart illustrating in greater detail certain embodiments of the native library thread objects shown in FIG. 5.

FIG. 9 is a flowchart illustrating in greater detail certain embodiments of the native library thread objects 540 shown in FIG. 5. A first thread object 910, labeled Thread1 in FIG. 9, is shown supporting the IUnknown interface of COM objects. The Thread1 object 910 shown in FIG. 9 includes a COM/ActiveX Object1 920. To illustrate that multiple thread objects may exist, FIG. 9 additionally shows a Thread2 object 930 including a COM/ActiveX Object2 940, a Thread3 object 950 including a COM/ActiveX Object3 960, and a Threadn object 970 including a COM/ActiveX Objectn 980. In other words, the 'n' index in the Threadn object 970 and the COM/ActiveX Objectn 980 indicates that any number of thread objects may exist at any point in time.

While the objects shown in the embodiments of FIG. 9 by COM/ActiveX Objects 1-n, 920, 940, 960 and 980, respectively, represent COM or ActiveX objects, in other embodiments they represent any type of native object. In such embodiments, the objects exist to create a thread in the out-of-process memory space to hold an ActiveX object, a COM object, or another native object. Additionally, the thread objects can exist in the in-process native library in other embodiments. In certain cases, the COM or ActiveX objects won't execute in the in-process memory space without errors. Thus, the out-of-process embodiments are described to enable developers to choose how to host the external COM or ActiveX objects. Other embodiments may include COM/ActiveX objects 1-n 920, 960, 940, 980 that exclude the creation of the thread itself. In such embodiments, the COM or ActiveX objects exist in the native library as objects executing in the memory space of the native library and are accessible in the same way as COM and ActiveX objects existing in threads, as described above.

In certain embodiments, for each native library, the platform dependent environment 102, 110 creates memory partitions for processes for use during their lifetime. As described above, separate and isolated memory partitions may be created for the in-process and out-of-process native libraries. Each process has at least one main thread that is the entry point for the process. A thread is a path of execution within the process, and generally is the same during the lifetime of the process. It is possible to create multiple threads within a single process, using thread API's provided by the platform dependent environment 102, 110. Each thread may become a unique path of execution in the process, and has concurrent access to the data in that process. Typically, this improves the overall responsiveness of the application. As described herein in relation to certain embodiments, native thread objects refer to threads executing within the native library encapsulating the functionality illustrated in FIG. 9. In other embodiments, the same functionality that exists within the native thread objects may also exist without the creation of new threads in either an in-process or out-of-process native library.

During event notification, an object, such as a COM or ActiveX object, can generate events. The object essentially calls a method on an interface on the client. Within the client, the interface that is called by the server, for example, COM or ActiveX objects or the native thread objects, is referred to as a sink interface since it is a sink for events. The server object can have one or more interfaces, and unidirectional communication occurs when a client connects to one of them. This communication is from the client to the server object. From the server's perspective, such an interface is an incoming interface, as clients call methods on the interface and calls come into the server object. When a server object generates events, the server object calls a method on the client's sink interface. From the server's perspective, this is referred to as an outgoing interface, as the calls are going out from the object.

The thread objects shown in the embodiment of FIG. 9 may include an event interface to pass event information to external tasks or objects. This event interface is also referred to as the sink interface. The wrapper object implements the sink interface and connects with the server object by passing a pointer to the sink object to the native thread object, which sinks the COM object or ActiveX control for event notification. The native thread object then uses this outgoing interface to notify the client of generated events and messages. In some embodiments, the client sinks with the native thread object which provides its own implementation of connecting to the COM or ActiveX object incoming interface, which notifies any client sink of events that are occurring. In other embodiments, the client sink may be directly connected with the COM or ActiveX object incoming interface, which can notify the client sink object of events that are occurring directly. Moreover, a client sink object may be an object that provides an implementation to a sink interface. Thus, the sink object can be the wrapper object itself, which provides the implementation. In another embodiment, the wrapper object can contain an internal object that serves as the sink object, which provides the sink interface implementation. Either way, the wrapper object knows of all events that are externally occurring and can process the events accordingly for processing by platform independent objects.

Figure 10:
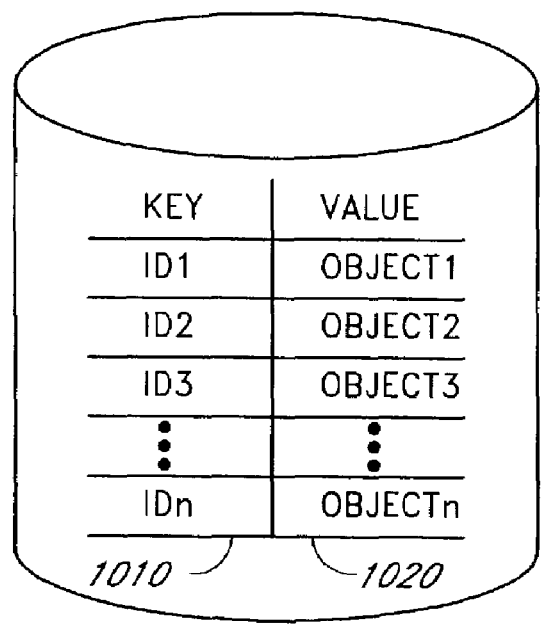
FIG. 10 is a diagram illustrating in greater detail embodiments of the object storage area shown in FIG. 5.

FIG. 10 is a diagram illustrating in greater detail embodiments of the object storage area 550 shown in FIG. 5. In these embodiments, the object storage area 550 includes a key column 1010 and a value column 1020. The key column 1010 includes storage for the identifiers for the objects stored in the object storage area 550. In FIG. 5, the identifiers are labeled as "ID1," "ID2," "ID3" and "IDn," to indicate that a multitude of object keys may be stored in the object storage area 550 at any given time. The object storage area 550 shown in FIG. 5 additionally includes the value column 1020 that includes the value of the object corresponding to the identifier stored in the key column 1010. In FIG. 5, the values are labeled as "Object1," "Object2," "Object 3" and "Objectn," to indicate that a multitude of object values may be stored in the object storage area 550 at any given time. In certain embodiments, only wrapper objects may be stored in the object storage area 550, but in other embodiments, any native library objects may be stored in the object storage area 550.

The object storage area 550, in some embodiments, is able to store Java objects that represent a COM object, an ActiveX object, of a custom Java object that has a predefined wrapper object. The identifiers stored on the object storage area 550 (ID, ID2, ID3 and IDn in FIG. 10) are, in certain embodiments, the unique identifier, such as a hash code, of the Java object that the wrapper object represent. The objects stored on the object storage area 550 (Object 1, Object2, Object3 and Objectn in FIG. 10) are the wrapper object for a COM object, an ActiveX object, a Java object, or other object type that may require storage and retrieval from the object storage area 550.

For illustrative purposes, an example of the use of the object storage area 550 for storing and retrieving object information arises when a Java object is instantiated and a wrapper object is created. The hash code of the Java object may be retrieved and used as the internal identifier to store the wrapper object in the object storage area 550. This wrapper object can correspond to a top-level Java object, and can associate the child object with the top-level Java object via the internal identifier. Thus, when an event occurs, or an error occurs, or any other message that needs to be passed to the Java object is generated, the internal identifier may be used by the child object to find the corresponding top-level Java object in the object storage area 550 so that messages can be sent to the top-level object. This can be used to notify the Java application hosting the Java object through the event notification process as described below in regard to FIGS. 11 and 15. In this way, the internal identifier, which in certain embodiments is stored on the object storage area 550, facilitates communication between the objects by providing a unique identifier to each of the objects created in the various environments.

Figure 11:
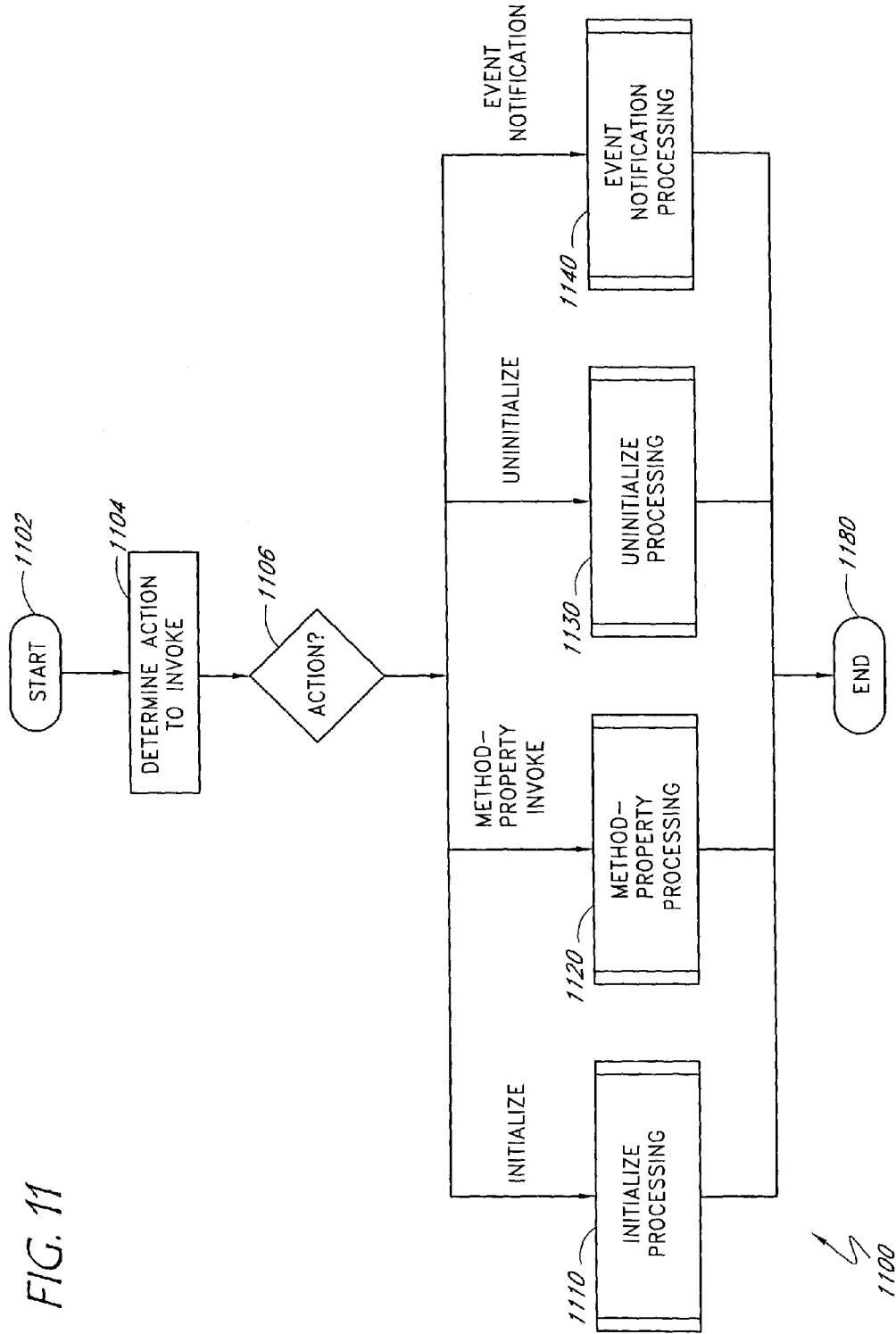
FIG. 11 is a flowchart illustrating a process of invoking certain actions in embodiments of the native library wrapper objects component shown in FIG. 5.

FIG. 11 is a flowchart illustrating a process 1100 of invoking certain actions in embodiments of the native library wrapper objects 530 component shown in FIG. 5. The process 1100 begins at a start block 1102. The process 1100 continues at a block 1104 to determine the action to invoke. At a decision block 1106, the process 1100 determines the appropriate sub-process to invoke based on the action to be performed. If the process 1100 determines that the initialize action was requested, the process 1100 invokes the initialize processing module 1110. The initialize processing module 1110 is shown and described in greater detail below in regard to FIG. 12.

If instead the process 1100 determines that the method-property invoke action was requested, the process 1100 invokes the method-property processing module 1120. The method-property processing module 1120 is shown and described in greater detail below in regard to FIG. 13. Alternatively, if the process 1100 determines that the uninitialize action was requested, the process 1100 invokes the uninitialize processing module 1130. The uninitialize processing module 1130 is shown and described in greater detail below in regard to FIG. 14. If the process 1100 determines that the event notification action was requested, the process 1100 invokes the event notification processing module 1140. The event notification processing module 1140 is shown and described in greater detail below in regard to FIG. 15. Following invocation of the initialize processing module 1110, the method-property processing module 1120, the uninitialize processing module 1130, or the event notification processing module 1140, depending on the action desired, the process 1100 ends at a block 1180.

Figure 12:
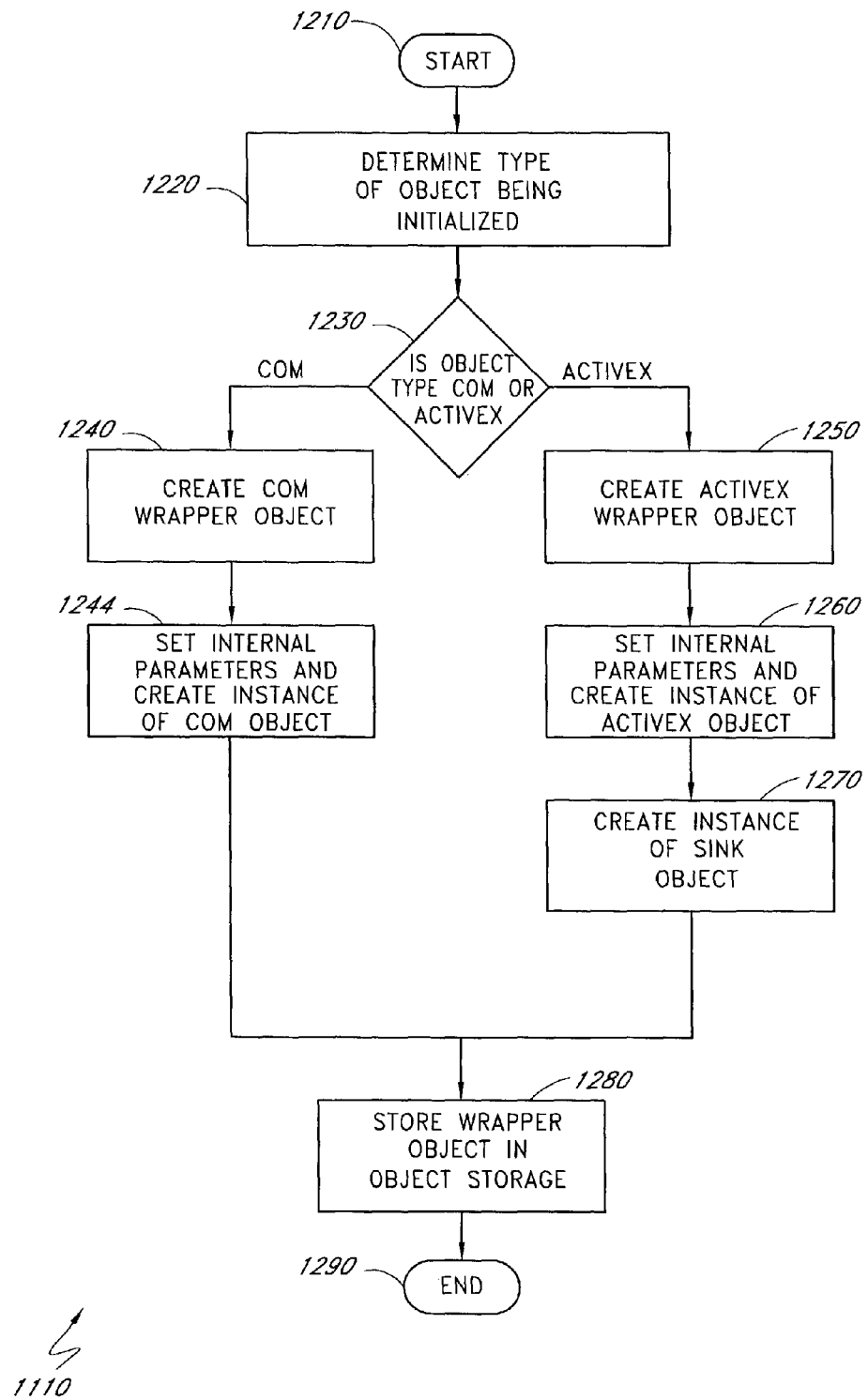
FIG. 12 is a flowchart illustrating the initialize process according to some embodiments of the process in FIG. 11.

FIG. 12 is a flowchart illustrating the initialize process 1110 according to some embodiments of the process 1100 in FIG. 11. The initialize process 1110 starts at a block 1210. As an example, the initialize process 1110 may be invoked when a Java object is created in the Java environment 520. The initialize process 1110 continues at a block 1220 to determine the type of object being initialized. If, at a decision block 1230, the process 1110 determines that a COM object is being initialized, the process 1110 continues at a block 1240 to create the wrapper object for the COM object. The process continues at a block 1244 to set internal parameters and create an instance of the COM object. Certain embodiments of the block 1244 include setting an internal variable that corresponds to the unique identifier of the Java object, for example, the hash code, setting an internal variable to the calling Java object data, or creating an instance of a COM object and setting a pointer to the IUnknown interface.

If, at a decision block 1230, the process 1110 instead determines that an ActiveX object is being initialized, the process 1110 continues at a block 1250 to create the wrapper object for the ActiveX object. The process continues at a block 1260 to set internal parameters and create an instance of the ActiveX object. Certain embodiments of the block 1260 include setting an internal variable that corresponds to the unique identifier of the Java object, for example, the hash code, setting an internal variable to the calling Java object data, invoking an application interface, or creating an instance of an ActiveX object and setting a pointer to the IUnknown interface. The process 1110 continues at a block 1270 to create an instance of a sink object. In some embodiments of the block 1270, the sink object implements the event interface between the COM or ActiveX object and the Java object, and the sink object is synchronized with the COM or ActiveX object to start receiving event information.

The block 1260 to set internal parameters and create an instance of the ActiveX object, and the block 1270 to create an instance of a sink object, may create instances in the in-process memory space in certain embodiments. However, in other embodiments, the blocks 1260 and 1270 may create instances of either ActiveX objects or sink objects, respectively, or both, in out-of-process memory space. Whether a COM object or an ActiveX object was created, the initialize process 1110 continues at a block 1280 to store the wrapper object created in the object storage area 550. In certain embodiments, the wrapper object is stored in the object storage area 550, where the object storage area 550 is implemented as an object registry having a Java object unique identifier, e.g., a hash code, acting as the storage key. The initialize process 1110 ends at a block 1290.

Figure 13:
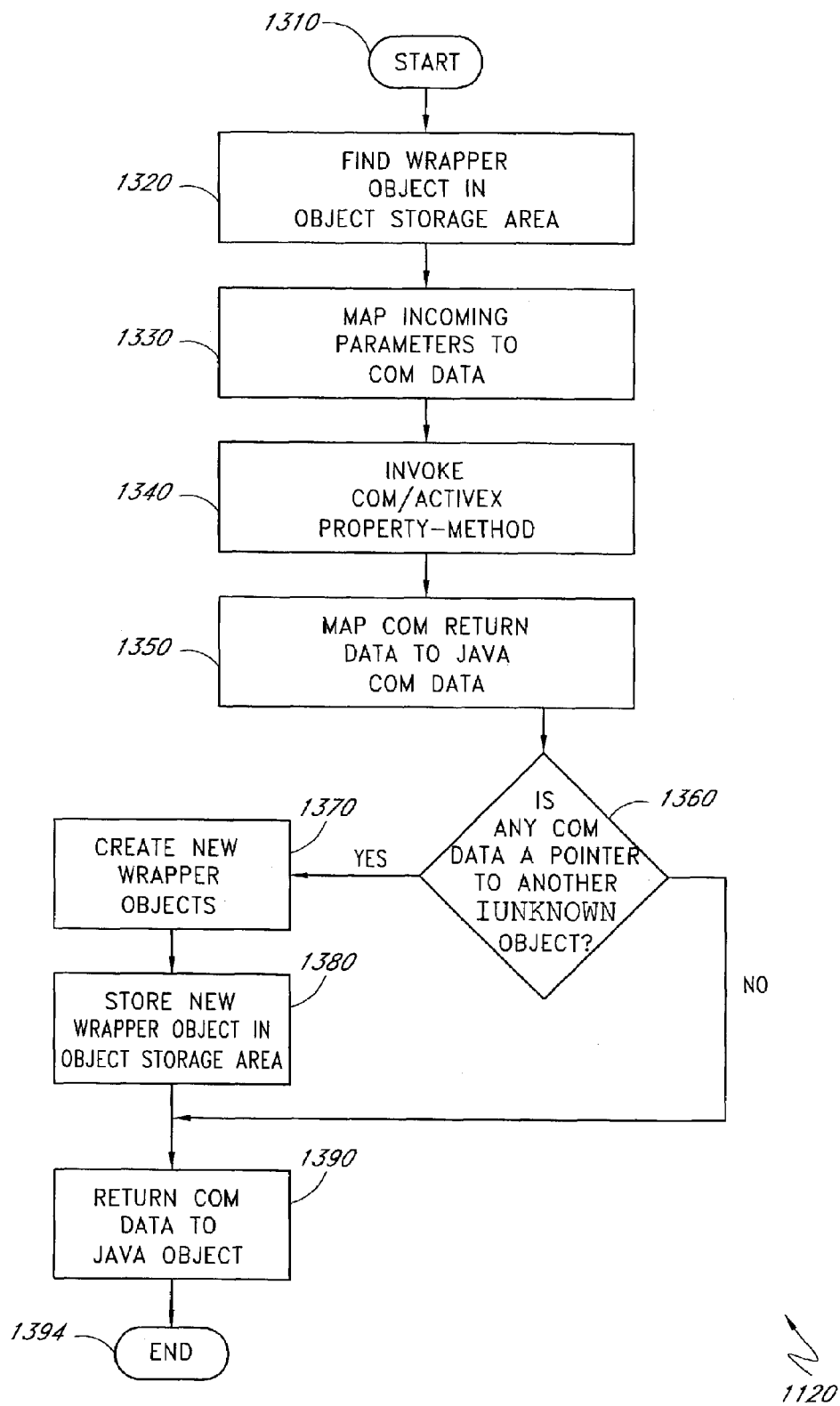
FIG. 13 is a flowchart illustrating the method-property process according to some embodiments of the process in FIG. 11.

FIG. 13 is a flowchart illustrating the method-property process 1120 according to some embodiments of the process 1100 in FIG. 11. The process 1120 starts at a block 1310. As an example, invocation of the process 1120 occurs when a method or property is accessed on the Java object interface by an application, for example, one or more of the domain specific applications 130. The process 1120 continues at a block 1320 to find the wrapper object in the object storage area 550. In some embodiments, the block 1320 includes finding the object using an object identifier (ID) as a look-up in a table referred to as an object registry, in which the look-up may use a Java object unique identifier, e.g., a hash code, to aid in finding the wrapper object. Of course, as would be apparent to one of ordinary skill in the technology, there are many equivalent ways to find and store the object, such as using a database application, encapsulating the object in a module using object oriented programming techniques, storing the object data in computer memory locations using sorting algorithms, or the like.

The process 1120 continues at a block 1330 for mapping incoming parameters to COM data. At a block 1340, the process 1120 invokes the appropriate COM or ActiveX property or method. In certain embodiments, since the wrapper object may be of a specific object type, the wrapper object may include information that indicates if access is to an ActiveX control or directly to a COM object. The process 1120 continues at a block 1350 to map COM return data to Java COM data. The return data in the block 1350 refers to data that is returned from the invocation of the process invoked in the block 1340.

Java COM data is used to refer to functionality within the custom Java API 140, which contains various classes for Java processing of COM data. COM data can be processed within the platform dependent environment 102, 110. Thus, if any messages, objects, or data that are COM data need to be processed in the platform independent environment 120, such as a JAVA environment, an equivalent Java COM data object is instantiated for Java processing of the COM data. If the COM data supports the IUnknown interface or IDispatch interface, the custom Java API 140 includes classes for interpreting the COM data as a Java object. This includes creation of new wrapper objects and the steps for properly setting up a new child Java object that represents a COM object interface. In this way, the domain specific applications 130 can invoke methods or properties on a Java COM object, that in turn can invoke the appropriate method or property on the corresponding COM object. Further embodiments include Java COM data that represents ActiveX controls, since ActiveX controls may also expose IUnknown or IDispatch interfaces.

The process 1120 continues at a decision block 1360 to determine if any COM data is a pointer to another IUnknown object. The term "IUnknown" refers to an interface that platform dependent objects support. Thus, if any platform dependent object that supports an IUnknown interface is encountered, a wrapper object is created so messages can be transmitted to the object or received from the object. The wrapper object supports the IDispatch interface to provide the late binding feature as discussed above in regard to FIGS. 5 and 8. In other words, using the wrapper objects, messages can be transmitted from Java objects to platform dependent objects, or from platform dependent objects to Java objects.

If it is determined at the decision block 1360 that any COM data is a pointer to another IUnknown object, the process 1120 continues to a block 1370 to create new wrapper objects and Java objects so messages can be transmitted between the Java objects and the COM objects. The process 1120 continues at a block 1380 to store the new wrapper object in the object storage area 550, e.g., with the unique identifier being, in some embodiments, the newly created hash code for the Java object. As described above, there are many ways of storing the wrapper object for subsequent access, and no particular implementation is required by the various embodiments described herein.

The process 1120 continues to a block 1390 to return COM data to the Java object. In addition, if it is determined at the decision block 1360 that no COM data is a pointer to another IUnknown object, the process 1120 continues to the block 1390 as well to return the COM data to the Java object. In certain embodiments, the COM data may be returned to the Java object in the block 1390 as a JVariant object, which is specific to the custom Java API and is used to pass data between the Java objects and the Variant structure of the COM object interface. The Variant structure of COM objects is described above in regard to FIG. 8. The process 1120 ends at a block 1394. While the embodiments in FIG. 13 show method calls and data from objects in the platform independent environment to objects in the platform dependent environment 102, 110, in other embodiments method calls and data may be in the other direction, that is, from objects in the platform dependent environment 102, 110 to objects in the platform independent environment, for example, through direct method calls or through events.

Figure 14:
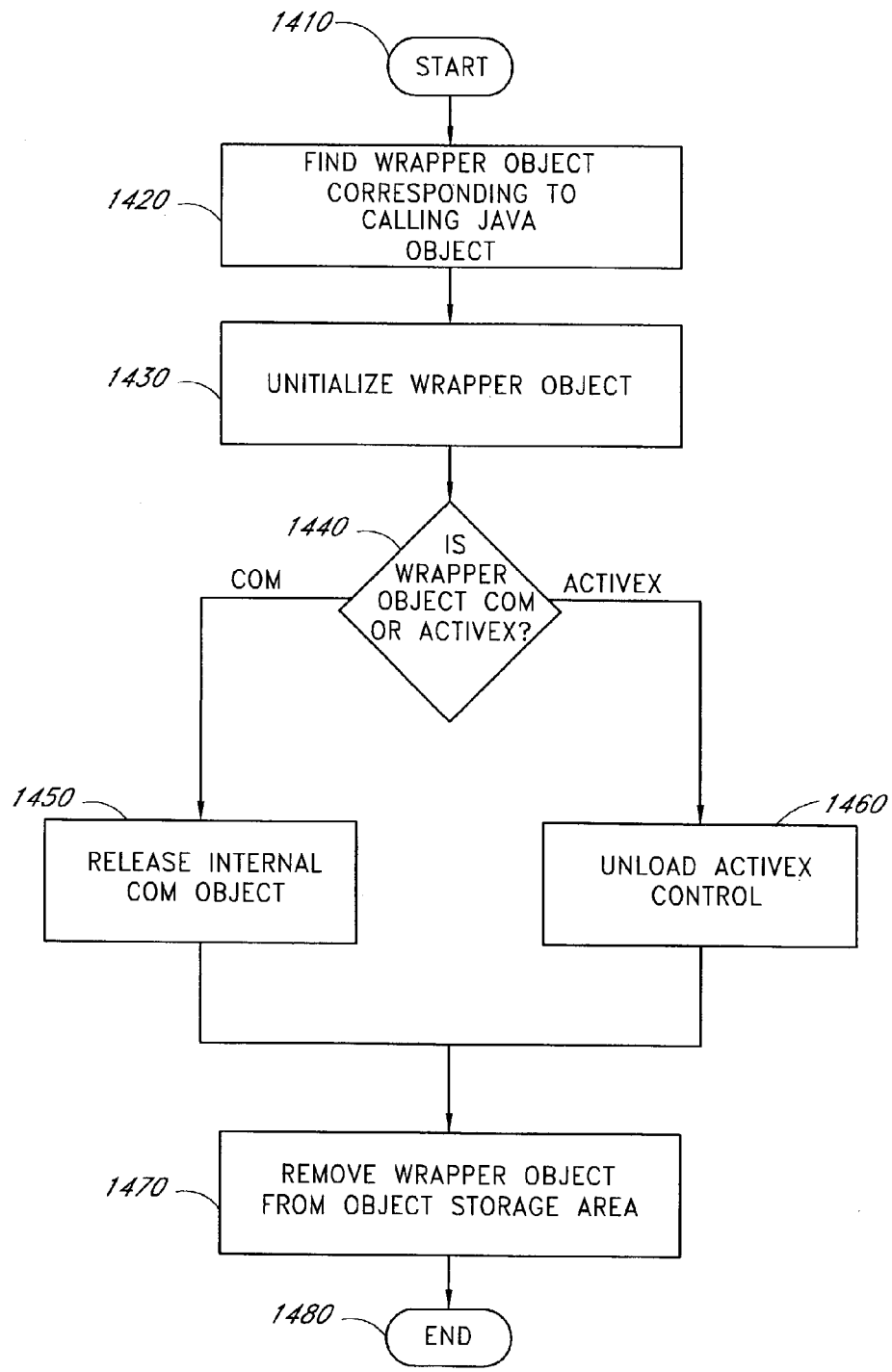
FIG. 14 is a flowchart illustrating the uninitialize process according to embodiments of the process in FIG. 11.

FIG. 14 is a flowchart illustrating the uninitialize process 1130 according to embodiments of the process 1100 in FIG. 11. The process 1130 begins at a start block 1410. The process 1130 may get executed, as an example, when the Java garbage collection task executes. The Java environment performs what is commonly referred to as garbage collection, which typically includes automatic detection and release of memory that is no longer in use, as do many other operating system and development environments. The process 1130 continues at a block 1420 to find the wrapper object corresponding to the calling Java object. In certain embodiments, the block 1420 finds the wrapper object by performing, for example, a lookup or by other direct retrieval, or by performing a function call of a module that returns the wrapper object data.

The process 1130 continues at a block 1430 to begin process of actually uninitializing the specific wrapper object. The process 1130 continues at a decision block 1440, at which the process 1130 determines whether the wrapper object to be uninitialized is a COM object or an ActiveX object. Of course, in other embodiments, the object to be uninitialized may be another type of platform dependent environment object. If it is determined at the decision block 1440 that the wrapper object to be uninitialized is a COM object, the process 1130 continues at a block 1450 to release the internal COM object. If, however, it is determined at the decision block 1440 that the wrapper object to be uninitialized is an ActiveX control, the process 1130 continues at a block 1460 to unload the ActiveX control. In certain embodiments, the step at the block 1460 may include unloading an instance of a native out-of-process object having a thread hosting a window that hosts an ActiveX or COM object.

In either case, whether the wrapper object to be uninitialized is a COM object or ActiveX control at the decision block 1440, the process 1130 continues at a block 1470 to remove the wrapper object to be uninitialized from the object storage area 550. As described above, this step may be performed in many ways, for example, by a function call, by removing the object data from an object registry, by utilizing a sort algorithm to remove an entry from a table or other memory storage, or the like. The process ends at a block 1480.

Figure 15:
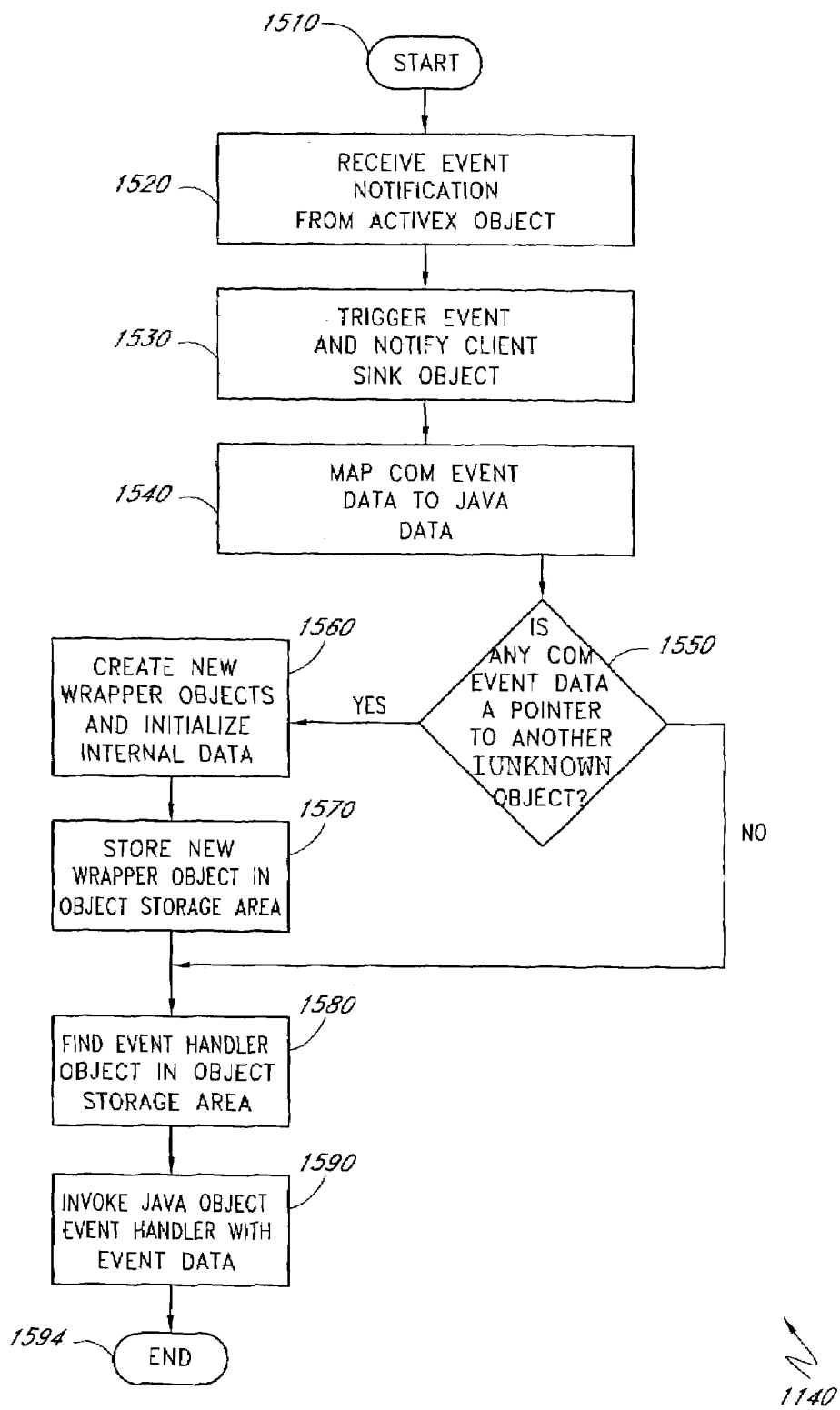
FIG. 15 is a flowchart illustrating the event notification process according to embodiments of the process in FIG. 11.

FIG. 15 is a flowchart illustrating the event notification process 1140 according to embodiments of the process 1100 in FIG. 11. The event notification process 1140 starts at a block 1510. As an example, the process 1140 may be invoked when an event is triggered in a COM or ActiveX object, which notifies the sink object, which in turn notifies the respective Java object of the event. The process continues at a block 1520 to receive the event notification from the COM or ActiveX object. The process continues at a block 1530 to trigger the event and notify the client sink object. The process continues at a block 1540 to map COM object event data to Java object data. In some embodiments, the mapping includes translating the COM object event data from the COM native interface format to the Java object interface format.

The process 1140 continues to a decision block 1550 to determine if COM event data is a pointer to another IUnknown object. Objects supporting the IUnknown interface are described in greater detail above in regard to FIG. 13. If it is determined at the decision block 1550 that the COM event data is a pointer to another IUnknown object, the process 1140 continues to a block 1560 to create one or more new wrapper objects and initialize internal data. The process 1140 continues at a block 1570 to store the new wrapper object in the object storage area 550.

The process 1140 continues at a block 1580 to find the event handler object in the object storage area 550. If, however, it is determined at the decision block 1550 that the COM event data is not a pointer to another IUnknown object, the process 1140 skips the blocks 1560 and 1570 and continues to the block 1580 to find the event handler object in the object storage area 550. The process 1140 continues at a block 1590 to invoke the Java object event handler with the event data that was passed from the COM object and that was mapped to Java data in the block 1540 as described above. The process 1140 ends at a block 1594.

Figure 16:
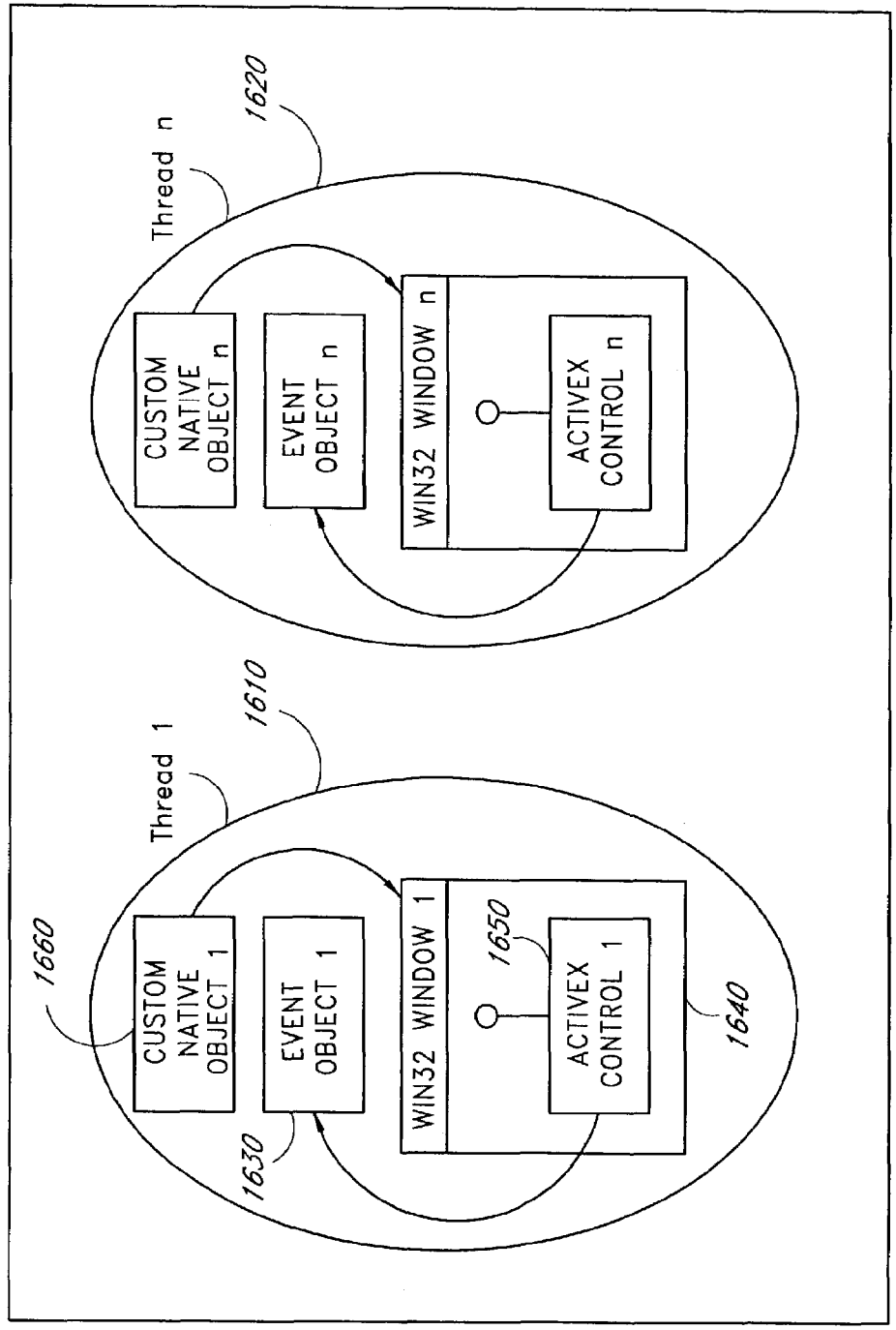
FIG. 16 is a diagram illustrating certain specific embodiments of the native library thread objects illustrated and described in regard to FIGS. 5 and 9.

FIG. 16 is a diagram illustrating certain specific embodiments of the native library thread objects 540 illustrated and described in regard to FIGS. 5 and 9. FIG. 16 shows thread objects labeled Thread1 1610 and Threadn 1620. In various embodiments, one or more thread objects may be created, as indicated by the index 'n' in the Threadn 1620. As threads Thread1 1610 and Threadn 1620 are similar other than the designated index number, the following description of Thread1 1610 applies analogously as well to Threadn 1620.

The embodiment of Thread 1 1610 shown in FIG. 16 includes a custom native object 1 1660 that creates a platform dependent window 1640, for example, a Win32 compatible window. The custom native object 1 1660 has a native interface for accessing methods and properties of the object. The Win32 window 1640 may include an ActiveX control 1 1650. The ActiveX control 1 1650 communicates with an event object 1 1630 for event notification, as shown in FIG. 16. The event notification is implemented, in certain embodiments, as a sink interface such as the native IEvents interface. The wrapper object implements this sink interface and passes a pointer of the sink interface to the native COM object or ActiveX control. The COM object or ActiveX control can then notify the client sink object of events that are occurring or have occurred.

In certain embodiments, the custom native object 1 1660 is a pointer to the IUnknown interface of the native out-of-process library instance. In other embodiments, the native library instance may exist in in-process memory space, or other location in the computer memory. Through the IUnknown interface the in-process library can, for example, load, unload, and send messages to the ActiveX COM objects. In other words, this defines an exposed interface through which external tasks and objects can access the platform dependent window, e.g., the Win32 window. As described above, other embodiments may include the components 1630, 1640, 1650, 1660 shown in FIG. 16 executing in the native library outside of the thread 1 1610. In such embodiments, the same functionality can exist, except that the creation of a new thread as illustrated in FIG. 16 may be excluded.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The embodiments described above are to be considered in all respects as illustrative only and not restrictive in any manner.

What is claimed is:

1. An electronic device for accessing objects executing in a platform dependent environment from objects executing in a platform independent environment, the platform independent environment and the platform dependent environment configured to execute in the electronic device, the electronic device comprising:
   a processor;
   a platform independent environment configured to execute on the processor;
   a platform dependent environment configured to execute on the processor, wherein the platform dependent environment is accessible to the platform independent environment;
   a first object that executes in a first process in the platform independent environment, wherein the first object provides dynamic access to other objects in the platform independent environment to invoke a second object in a second process that executes in the platform dependent environment, wherein the second object is a platform dependent object that exposes a native interface;
   a native library of the platform dependent environment wherein the access to the second object is via the native interface exposed by the second object within the native library; and
   a native wrapper object executing in the platform dependent environment that is accessible to the platform independent environment, wherein the native wrapper object is dynamically created to invoke the second object in the second process, and wherein the native wrapper object stores information about at least one of the platform independent and the platform dependent objects, wherein the native wrapper object receives data from the first object executing in the platform independent environment and communicates the data to the second object and wherein the native wrapper object receives data from the second object executing in the platform dependent environment and communicates the data to the first object so as to provide bi-directional communication between the first object and the second object and to notify the first object of events generated by the second object.

2. The electronic device of claim 1, further comprising an object storage area for storing information associated with the second object.

3. The electronic device of claim 2, wherein the object storage area is accessed via code executing within the native library.

4. The electronic device of claim 1, wherein the second object exposes a method that is accessible by the first object.

5. The electronic device of claim 1, wherein the second object exposes a property that is accessible by the first object.

6. The electronic device of claim 1, wherein the platform dependent environment is compatible with one of a Windows, Linux, or Macintosh operating system.

7. The electronic device of claim 1, wherein the platform dependent environment is an application space provided by an operating system.

8. The electronic device of claim 1, wherein the platform independent environment is a Java environment.

9. The electronic device of claim 8, wherein the Java environment executes in out-of-process memory space.

10. The electronic device of claim 1, wherein the platform independent environment comprises a custom Java application programming interface (API).

11. The electronic device of claim 10, further comprising a domain specific application executing in the platform independent environment, wherein the custom Java API is accessible via the domain specific application.

12. A method of accessing objects executing in a platform dependent environment from objects executing in a platform independent environment, the method comprising:
   creating a first object in a first process that executes in a platform independent environment;
   loading a native wrapper object in a platform dependent environment;
   creating a second object in a second process executing in the platform dependent environment, wherein the second object is a platform dependent object that exposes a native interface and wherein the first object is an instance of a class representing the second object;
   accessing the second object from the first object by invoking an interface of the native wrapper object, wherein accessing the second object is via the native interface exposed by the second object within a native library of the platform dependent environment;
   accessing the first object from the second object by invoking an interface of the native wrapper object, wherein the native wrapper object is dynamically created, and wherein the native wrapper object stores information about at least one of the platform independent and the platform dependent objects, wherein the native wrapper object receives data from the first object executing in the platform independent environment and communicates the data to the second object and wherein the native wrapper object receives data from the second object which is executing in the platform dependent environment and communicates the data to the first object so as to provide bi-directional communication between the first and the second object; and
   notifying the first object of events generated by the second object.

13. The method of claim 12, wherein the platform independent environment comprises a custom Java application programming interface (API).

14. The method of claim 12, wherein the second object is created in a native out-of-process library in the platform dependent environment.

15. The method of claim 14, wherein the native out-of-process library is a component object model (COM) library.

16. The method of claim 12, wherein the second object is created in a native in-process library in the platform dependent environment.

17. The method of claim 12, wherein the second object exposes an interface method accessible to the first object via the native library.

18. The method of claim 12, wherein the second object exposes an interface property accessible to the first object via the native library.

19. The method of claim 12, wherein the second object is a component object model (COM) object.

20. The method of claim 12, wherein the second object is an ActiveX control.

21. The method of claim 12, further comprising storing information in an object storage area, wherein the information facilitates communications between the first object and the second object.

22. The method of claim 12, further comprising storing information in an object storage area, wherein the information uniquely identifies objects in the platform dependent and platform independent environments.

23. A method of invoking an interface of an object hosted on a platform dependent environment by an object executing on a platform independent environment, the method comprising:
using data associated with a first object in a first process executing in a platform independent environment to dynamically find a corresponding second object, the second object executing in a second process in a platform dependent environment, wherein the first object provides access to other objects to invoke the second object;
converting, via a native wrapper object, message data from the first object to data associated with the second object executing in a platform dependent environment and message data from the second object to data associated with the first object executing in a platform independent environment, wherein the native wrapper object is dynamically created, wherein the native wrapper object stores information about at least one of the platform independent and the platform dependent objects, wherein the native wrapper object provides bi-directional communication between the first object executing in the platform independent environment and the second object which is executing in the platform dependent environment;
invoking an interface exposed by the second object hosted within a native library executing in the platform dependent environment, said interface comprising an event generating interface;
converting, via the native wrapper object, return data of the second object to data associated with the first object;
returning the converted data associated to the first object;
invoking an event handler object via the native wrapper object in response to the data received; and
notifying the first object of events generated by the second object.

24. The method of claim 23, wherein the platform independent environment is a Java environment.

25. The method of claim 23, wherein the native library is a native out-of-process library.

26. The method of claim 25, wherein the native out-of-process library is a component object model (COM) library.

27. The method of claim 23, wherein the native library is a native in-process library.

28. The method of claim 23, wherein the platform dependent environment is compatible with one of a Windows, Linux, or Macintosh operating system.

29. The method of claim 23, wherein the native library hosts the second object that exposes an interface that is accessible by the first object.

30. The method of claim 23, wherein the native library hosts the second object that exposes a property that is accessible by the first object.

31. The method of claim 23, wherein the second object is a component object model (COM) object.

32. The method of claim 23, wherein the second object is an ActiveX control.

33. The method of claim 23, further comprising storing information in an object storage area, wherein the information facilitates communications between the first object and the second object.

34. The method of claim 23, further comprising storing information in an object storage area, wherein the information uniquely identifies objects in the platform dependent and platform independent environments.

35. An electronic device system for accessing objects executing in a platform dependent environment from objects executing in a platform independent environment, the platform independent environment and the platform dependent environment configured to execute in the electronic device, the electronic device comprising:
means for processing comprising a processor;
means for creating a first object in a first process that executes in a platform independent environment, wherein the platform independent environment is configured to execute on the processing means;
means for loading a native wrapper object in a platform dependent environment, wherein the platform dependent environment is configured to execute on the processing means;
means for creating a second object in a second process executing in the platform dependent environment, wherein the second object is created in a native library in the platform dependent environment and wherein the first object is an instance of a class representing the second object executing in the native library,
wherein the native wrapper object is dynamically generated, and wherein the native wrapper object stores information about at least one of the platform independent and the platform dependent objects, wherein the native wrapper object provides bi-directional communication between the first object executing in the platform independent environment and the second object which is executing in the platform dependent environment, wherein said native wrapper object is configured to:
receive event data from one of the first or the second objects; and
invoke an event handler object via the native wrapper object in response to receiving the event data; and
means for notifying the first object of events generated by the second object, wherein the notifying means is configured to execute on the means for processing.

36. The electronic device of claim 35, wherein the platform independent environment comprises a custom Java application programming interface (API).

37. The electronic device of claim 35, wherein the second object is created from a native out-of-process library in the platform dependent environment.

38. The electronic device of claim 37, wherein the native out-of-process library is a component object model (COM) library.

39. The electronic device of claim 35, wherein the second object is created in a native in-process library in the platform dependent environment.

40. The electronic device of claim 35, wherein the display window is compatible with a platform windowing application programming interface (API).

41. The electronic device of claim 35, wherein the second object exposes an interface method accessible to the first object via the native wrapper object.

42. The electronic device of claim 35, wherein the second object exposes an interface property accessible to the first object via the native wrapper object.

43. The electronic device of claim 35, wherein the second object is a component object model (COM) object.

44. The electronic device of claim 35, wherein the second object is an ActiveX control.

45. The electronic device of claim 35, further comprising means for storing information in an object storage area, wherein the information facilitates communications between the first object and the second object.

46. The method of claim 35, further comprising storing information in an object storage area, wherein the information uniquely identifies objects in the platform dependent and platform independent environments.

47. A program storage device for storing instructions that when executed by a processor perform the method comprising:
  creating a first object that executes in a first process in a platform independent environment;
  loading a native wrapper object in a platform dependent environment;
  creating a second object in a second process executing in the platform dependent environment, wherein the second object is created in a native library in the platform dependent environment, wherein the first object is an instance of a class representing the second object executing in the native library, wherein the native wrapper object is dynamically created, and wherein the native wrapper object stores information about at least one of the platform independent and the platform dependent objects, wherein the native wrapper object provides bi-directional communication between the first object executing in the platform independent environment and the second object which is executing in the platform dependent environment;
    receiving, at the native wrapper object, event data from one of the first or the second object;
    invoking an event handler object via the native wrapper in response to receiving the event data; and
    notifying the first object of events generated by the second object.

48. The program storage device of claim 47, wherein the platform independent environment comprises a custom Java application programming interface (API).

49. The program storage device of claim 47, wherein the second object is created in a native out-of-process library in the platform dependent environment.

50. The program storage device of claim 49, wherein the native out-of-process library is a component object model (COM) library.

51. The program storage device of claim 47, wherein the second object is created in a native in-process library in the platform dependent environment.

52. The program storage device of claim 47, wherein the display window is compatible with a platform windowing application programming interface (API).

53. The program storage device of claim 47, wherein the second object exposes an interface method accessible to the first object via the native library.

54. The program storage device of claim 47, wherein the second object exposes an interface property accessible to the first object via the native library.

55. The program storage device of claim 47, wherein the second object is a component object model (COM) object.

56. The program storage device of claim 47, wherein the second object is an ActiveX control.

57. The program storage device of claim 47, further comprising storing information in an object storage area, wherein the information facilitates communications between the first object and the second object.

58. The method of claim 47, further comprising storing information in an object storage area, wherein the information uniquely identifies objects in the platform dependent and platform independent environments.

59. An electronic device for accessing objects executing in a platform dependent environment from objects executing in a platform independent environment, the platform independent environment and the platform dependent environment configured to execute in the electronic device, the electronic device comprising:
  a processor;
  a platform independent environment configured to execute on the processor;
  a platform dependent environment configured to execute on the processor, wherein the platform dependent environment is accessible to the platform independent environment;
  a first object that executes in a first process in the platform independent environment;
  a second object in a second process that executes in the platform dependent environment wherein the second object is a platform dependent object that exposes a native interface;
  a native library of the platform dependent environment, wherein access to the second object is via the native interface exposed by the second object within the native library; and
  a native wrapper object executing in the platform dependent environment that is accessible to the platform independent environment, wherein the native wrapper object is dynamically created to invoke the second object in the second process, and wherein the native wrapper object stores information about at least one of the platform independent and the platform dependent objects, wherein the native wrapper object is configured to provide bi-directional communication between the first object executing in the platform independent environment and the second object which is executing in the platform dependent environment, wherein said native wrapper object is configured to:
    receive data from one of the first or the second object;
    invoke an object via the native wrapper object in response to receiving the data; and
    notify the first object of events generated by the second object.

60. The electronic device of claim 59, wherein the platform dependent environment is an application space provided by an operating system.

61. The electronic device of claim 59, wherein the native wrapper object is configured to convert the data received from the first object into data associated with the second object and convert the data received from the second object into data associated with the first object.

* * * * *